United States Patent
Rance et al.

(10) Patent No.: US 9,032,441 B2
(45) Date of Patent: May 12, 2015

(54) SYSTEM AND METHOD FOR SELF MANAGEMENT OF A LIVE WEB EVENT

(75) Inventors: Peter Rance, London (GB); Dorian Logan, London (GB); Kenneth Winter, London (GB)

(73) Assignee: BrightTALK Limited, London (GB)

( * ) Notice: Subject to any disclaimer, the term of this patent is extended or adjusted under 35 U.S.C. 154(b) by 794 days.

(21) Appl. No.: 12/231,493

(22) Filed: Sep. 2, 2008

(65) Prior Publication Data

US 2010/0058410 A1 Mar. 4, 2010

(51) Int. Cl.
| | |
|---|---|
| H04N 7/173 | (2011.01) |
| H04N 5/445 | (2011.01) |
| H04N 7/14 | (2006.01) |
| G06F 3/00 | (2006.01) |
| G06F 13/00 | (2006.01) |
| H04N 21/61 | (2011.01) |
| H04N 21/262 | (2011.01) |
| H04N 21/2743 | (2011.01) |
| H04N 21/475 | (2011.01) |
| H04N 21/4788 | (2011.01) |

(52) U.S. Cl.
CPC .......... *H04N 21/6125* (2013.01); *H04N 7/173* (2013.01); *H04N 21/26258* (2013.01); *H04N 21/2743* (2013.01); *H04N 21/4758* (2013.01); *H04N 21/4788* (2013.01)

(58) Field of Classification Search
USPC ............................ 725/50, 97, 109; 348/14.08
See application file for complete search history.

(56) References Cited

U.S. PATENT DOCUMENTS

| | | |
|---|---|---|
| 5,565,923 A | 10/1996 | Zdepski |
| 6,442,598 B1 | 8/2002 | Wright et al. |
| 6,728,753 B1 * | 4/2004 | Parasnis et al. ............... 709/203 |
| 6,728,759 B1 | 4/2004 | Na |
| 6,760,749 B1 | 7/2004 | Dunlap et al. |
| 6,774,926 B1 * | 8/2004 | Ellis et al. ................... 348/14.01 |
| 7,050,603 B2 | 5/2006 | Rhoads et al. |
| 7,142,250 B1 | 11/2006 | Black |
| 7,328,239 B1 | 2/2008 | Berberian et al. |
| 7,369,515 B2 | 5/2008 | Salesky et al. |
| 7,412,533 B1 | 8/2008 | Johnson et al. |
| 7,751,347 B2 | 7/2010 | Giroti |
| 8,446,846 B1 | 5/2013 | Saleem et al. |
| 8,514,762 B2 | 8/2013 | Du Hart, IV et al. |
| 2001/0047516 A1 | 11/2001 | Swain et al. |
| 2002/0016858 A1 * | 2/2002 | Sawada et al. ................ 709/238 |
| 2002/0036694 A1 | 3/2002 | Merril |
| 2002/0103696 A1 * | 8/2002 | Huang et al. ..................... 705/12 |
| 2002/0104096 A1 | 8/2002 | Cramer et al. |
| 2002/0116297 A1 | 8/2002 | Olefson |
| 2002/0120939 A1 * | 8/2002 | Wall et al. ........................ 725/87 |
| 2002/0198943 A1 | 12/2002 | Zhuang et al. |
| 2003/0034999 A1 | 2/2003 | Coughlin, III et al. |
| 2003/0158816 A1 | 8/2003 | Rouse |
| 2003/0200001 A1 | 10/2003 | Goddard |
| 2004/0032424 A1 * | 2/2004 | Florschuetz .................. 345/748 |

(Continued)

*Primary Examiner* — Ricky Chin
(74) *Attorney, Agent, or Firm* — Carr & Ferrell LLP

(57) ABSTRACT

A system, method, and computer program for self management of a live web event is provided. In exemplary embodiments, an individual associated with a channel may schedule a web event. Upon scheduling, a user, such as one or more presenters, may be provided a management interface through which content may be prepared for the live web event during a self preparation process. In exemplary embodiments, the user may upload content (e.g., images such as slides) and generate content (e.g., polling questions and answers) autonomously.

38 Claims, 13 Drawing Sheets

(56) References Cited

U.S. PATENT DOCUMENTS

| | | |
|---|---|---|
| 2004/0153504 A1* | 8/2004 | Hutchinson et al. .......... 709/204 |
| 2004/0193683 A1* | 9/2004 | Blumofe ....................... 709/204 |
| 2004/0225728 A1* | 11/2004 | Huggins et al. ............... 709/223 |
| 2004/0243922 A1* | 12/2004 | Sirota et al. ................... 715/500 |
| 2005/0076387 A1 | 4/2005 | Feldmeier |
| 2005/0125453 A1 | 6/2005 | Rozack |
| 2005/0160367 A1* | 7/2005 | Sirota et al. ................... 715/753 |
| 2006/0179454 A1 | 8/2006 | Shusman |
| 2007/0044133 A1 | 2/2007 | Hodecker |
| 2007/0078768 A1 | 4/2007 | Dawson |
| 2007/0118396 A1 | 5/2007 | Matz et al. |
| 2008/0195743 A1* | 8/2008 | Brueck et al. ................. 709/231 |
| 2008/0196079 A1 | 8/2008 | Lee et al. |
| 2009/0019374 A1* | 1/2009 | Logan et al. ................... 715/753 |
| 2009/0024923 A1 | 1/2009 | Hartwig et al. |
| 2009/0037520 A1* | 2/2009 | Loffredo ....................... 709/203 |
| 2009/0055385 A1 | 2/2009 | Jeon et al. |
| 2009/0070407 A1* | 3/2009 | Castle et al. .................. 709/203 |
| 2009/0164875 A1 | 6/2009 | Rance et al. |
| 2009/0164876 A1 | 6/2009 | Logan et al. |
| 2009/0286509 A1 | 11/2009 | Huber et al. |
| 2010/0088126 A1* | 4/2010 | Iaia et al. |
| 2010/0293048 A1 | 11/2010 | Singolda et al. |
| 2012/0158888 A1 | 6/2012 | Rance et al. |
| 2012/0191582 A1 | 7/2012 | Rance et al. |

\* cited by examiner

SYSTEM AND METHOD FOR SELF MANAGEMENT OF A LIVE WEB EVENT

CROSS-REFERENCE TO RELATED APPLICATIONS

The present application is related to U.S. patent application Ser. No. 12/004,532, filed Dec. 21, 2007, entitled, "System and Method for Providing a Web Event Channel Player," and U.S. patent application Ser. No. 12/151,768, filed May 8, 2008, entitled "Systems and Methods for Integrating Live Audio Communication in a Live Web Event," both of which are hereby incorporated by reference.

BACKGROUND

1. Field of the Invention

The present invention relates generally to web events, and more particularly to self management of a web event.

2. Background Art

Using the Internet to distribute videos is becoming increasingly prevalent. For example, YouTube allows a distributor to embed pre-recorded videos within a webpage. Typically, the pre-recorded videos are embedded by inserting a piece of code for each video. The code will provide a link to the video when activated. In alternative embodiments, the distributor may upload pre-recorded videos to a content provider. The content provider may then provide a list of the uploaded pre-recorded videos on an associated website. Viewers may then access the pre-recorded videos via the associated website.

Furthermore, web conferencing and presentations are also increasing in popularity. Typically, participants will schedule a conference or presentation time. At the predetermined time, the participants will access a particular website or link. Subsequently, one or more of the presenters will then present or moderate the conference. Typically, these conferences are not recorded for playback and users can only listen, but not provide input. Often times, these web conferences do not allow participants to prepare and store context with the conference provider prior to the conference.

In further conferencing embodiments, a telephone conference may be utilized. Typically, participants will schedule the telephone conference and set up a conference bridge. At the predetermined time, the participants will call into the phone bridge and have a discussion.

As such, web conferences and telephone conferences have traditionally been used as two distinct and separate forms of conferencing. Recently, conferences have been used whereby a web browser is used to share visuals, such as slides, and participants use conference phones to chat via a separate phone line. Disadvantageous, these conferences require all participants to be connected via a telephone. In some cases, these conferences also do not allow preparation and storing of content prior to the conference. Typically, any content that is shared is provided from the presenter via an associated device during the conference. This may result in latency in visual content versus audio.

SUMMARY OF THE INVENTION

A system, method, and computer program for self management of a live web event is provided. In exemplary embodiments, an individual associated with a channel may schedule a web event. In exemplary embodiments, the individual may access a scheduling interface which requests scheduling information for establishing the web event. Using the scheduling information, the web event may be scheduled for a particular channel of the channel owner.

Upon scheduling, a user, such as one or more presenters, may be provided a management interface through which content may be prepared for the live web event during a self preparation process. In exemplary embodiments, the user may upload content (e.g., images such as slides) and generate content (e.g., polling questions and answers) autonomously. The user may also edit previously stored content associated with the web event. In exemplary embodiments, the user is allowed to upload, generate, and edit content up to a lockout time period. Once the lockout time period is reached, the users may, in some embodiments, only be allowed to view previously prepared and stored content.

In exemplary embodiments, all user devices (e.g., presenter, subscriber, and channel owner devices) are synchronized to a system clock of a channel management system. As such, all users will be synchronized to a same lockout time, final run-up time, and web event start time. During the final run-up time, presenters may be requested to dial into the channel management system. The presenter may also be provided with audio cues, visual cues, or a combination of both cues. When the system clock counts down to zero, the presenter is directed to start the web event.

BRIEF DESCRIPTION OF THE DRAWINGS

FIG. 6a and FIG. 6b are example screenshots illustrating vote preparation.

DESCRIPTION OF EXEMPLARY EMBODIMENTS

Embodiments of the present invention provide systems and methods for allowing autonomous set-up and preparation for a live web event. In exemplary embodiments, a presenter or other individuals associated with the live web event are enabled to manage (e.g., set-up and prepare) the live web event independent of outside assistance. Set-up and preparation may include, for example, scheduling a web event, loading web event content, and organizing web event content including images (e.g., slides) and votes (e.g., questions and answers) for audience polling. The live web events may comprise any event occurring on a network such as, for example, a presentation having a slide show that is synchronized with live audio.

Figure 1:
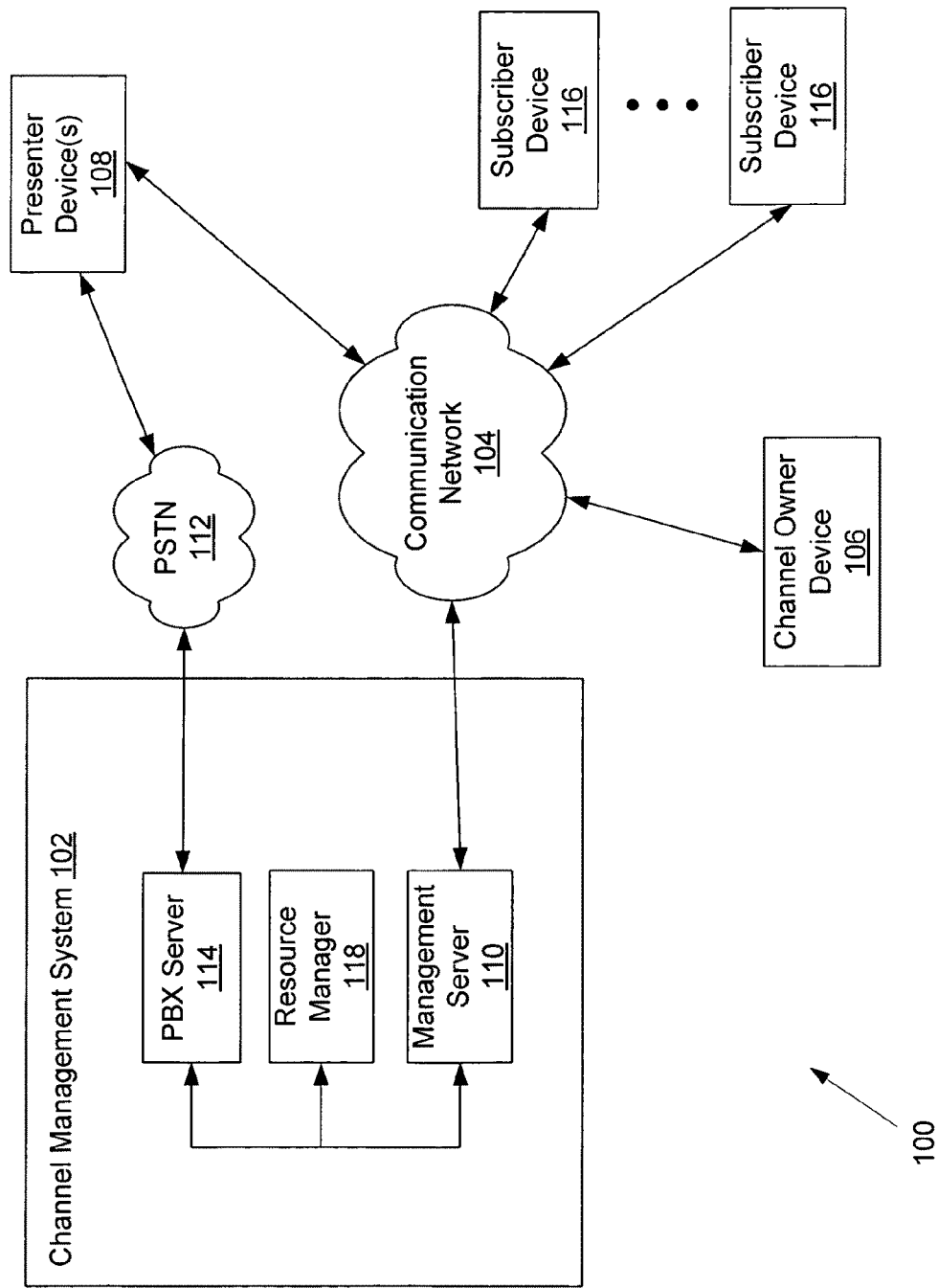
FIG. 1 is a diagram of an exemplary environment wherein embodiments of the present invention may be practiced.

Referring now to FIG. 1, an exemplary environment 100 for providing a live web event is shown. The exemplary environment 100 comprises a channel management system 102 in communication via a communication network 104 to a channel owner device 106. The communication network 104 may comprise the Internet, wide area network, and/or local area network.

The channel owner device 106 may comprise any computing device of a channel owner configured to disseminate information. Typically, a channel provided by the channel owner may be directed to a particular subject matter that is associated with the channel owner of the channel owner device 106. A channel owner may comprise any entity that desires to disseminate information. For example, an investment company may provide a channel that is directed to mutual fund and stock investment events. In some embodiments, a channel may be associated with more than one channel owner or a channel owner may be associated with more than one channel. It should be noted that channel owner, as used herein, may refer to any individual that performs actions on behalf of an actual owner of the channel (e.g., an employee of the channel owner).

In exemplary embodiments, the channel owner embeds a code associated with the channel player in a website owned, provided by, or associated with the channel owner via the channel owner device 106. The code comprises one or more instructions executable by a processor. According to exemplary embodiments, access to the channel player is provided by embedding a piece of software code (e.g., single line of code) within a webpage where channel player access is desired. This single piece of software code will activate an instance of the channel player on a user's computing device (e.g., subscriber device 116), which will provide access to the channel provided by the channel owner device. It should be noted that any number of users may activate the code to bring up an instance of the channel player on their respective computing devices. Each user will then have access to the channel and have independent control over what content to view (e.g., which events of the channel to access).

In an alternative embodiment, users may activate a channel player via a link or code on a website associated with the channel management system 102, on a website that is not owned, provided by, or associated with the channel owner (i.e., a non-channel owner), or be directed to a stand-alone version of the channel player. The stand-alone channel player may comprise a program that installs on a computing device (e.g., iPod, PDA, etc.) and is executed outside of a web browser. Alternately, the code may comprise JavaScript which calls the management server 110 to launch the channel player.

Accordingly, web events (e.g., webcasts) of the channel may be under the control of the channel owner and/or the channel owner device 106. As such, the channel owner may arrange for one or more presenters via their associated presenter devices 108 to present events on the channel owner's channel. In exemplary embodiments, the channel owner may via the channel owner device 106 set-up and/or prepare one or more web events for their channel. As such, the channel owner may schedule web events. Once scheduled, the channel owner may, in accordance with one embodiment, invite one or more presenters to participate in the web event.

Subsequently, the channel owner or the presenter may prepare content for the web event. Preparation of content may comprise uploading images such as slides, documents, Power Point presentations, and videos, for example, to the management server 110 of the channel management system 102 prior to the web event. Additionally, the channel owner or presenter may prepare content directly with the management server 110. For example via an interface provided to their respective devices (i.e., channel owner device 106 or presenter device 108) by the management server 110, the channel owner or presenter may generate a plurality of questions for polling of the audience. The management server 110 will be discussed in more details in connection with FIG. 2 below.

In exemplary embodiments, one or more of the presenters are associated with a computing device (i.e., presenter device 108) through which the presenter may prepare content for the web event, and from which control over the content (e.g., images or videos) during the web event may be enabled. In these embodiments, the computing device may comprise a channel application which allows the presenter to upload the web event content to, or generate content with, the channel management system 102 prior to the live web event.

The presenter may also provide live audio (e.g., commentary) during the web event. In one embodiment, the audio is provided via the communication network 104 (e.g., VoIP). In an alternative embodiment, the audio is provided via a phone call conducted over a public switched telephone network (PSTN) 112. In this embodiment, the audio may be received by a private branch exchange (PBX) server 114 of the channel management system 102.

One or more presenters may disseminate information to one or more users (i.e., subscribers) via the web event. For example, each presenter may utilize a feed to provide audio data, which is then encoded into a formatted audio stream which may be synchronized with control data (e.g., to control display of the content) to generate the web event. The live audio and control data received by the channel management system 102 may be synchronized by the management server 110 as described in co-pending U.S. patent application Ser. No. 12/151,768, entitled "Systems and Methods for Integrating Live Audio Communication in a Live Web Event," which is hereby incorporated by reference.

The environment 100 also comprises a plurality of subscriber devices 116 associated with users or subscribers. These subscribers each subscribe to one or more channels associated with the channel management system 102 and/or the channel owner. Once subscribed, the subscriber will have access to events within the subscribed-to channel via their computing device. Thus, for example, the subscriber can access archived past events and view live events via a browser application on their subscriber device 116. The subscriber device 116 may also access a list of future, planned events. According to some embodiments, the subscriber may receive communications from the channel owner regarding future events.

The channel management system 102 may also comprise a resource manager 118. In exemplary embodiments, the resource manager 118 is configured to manage pools of resources. These pools of resources may comprise a group of servers or modules, each of which may provide the same service for an application (e.g., a group of media encoders, slide converters, transcoders). These servers may be real or virtual. In some embodiments, each of the resource (e.g., server or module) may be allocated to a specific process at a time for a single user.

The exemplary resource manager 118 may monitor the pool of resources in order to allocate resources. For example, if there are twenty media encoders, twelve media encoders are allocated and currently encoding, and three media encoders are in an error state, then five media encoders are available. Thus, when a request for a media encoder is received by the channel management system 102, the resource manager 118 receives the request and allocates one of the available media encoders.

In some embodiments, the resource manager 118 may also track which users, channel owners, and web events are allocated which resources. The tracking information may then be used to determine where control data should be routed. For example, the resource manager 118 may know that webcast (i.e., web event) ID#3 is assigned to media encoder #15, so when a presenter associated with webcast ID#3 clicks on "go to next slide," the corresponding control data to change to the next slide will be sent to media encoder #15.

In further embodiments, the resource manager 118 may be configured to dynamically reallocate resources if a resource fails. For example, if media encoder #15 fails during a live web event, the resource manager 118 may automatically reallocate the encoding process to media encoder #17.

It should be noted that the environment 100 of FIG. 1 is exemplary. Alternative embodiments may comprise additional or fewer elements and still fall within the scope of various embodiments. For example, any number of channel owner devices 106, presenter devices 108, and subscriber devices 116 may be present in the environment 100 at any one time. Furthermore, the channel management system 102 may be comprised of more servers. For example, regional management servers 110 may be provided. It should also be noted that any preparation performed by a presenter may also be performed by an individual associated with the channel owner, or vice-versa.

Figure 2:
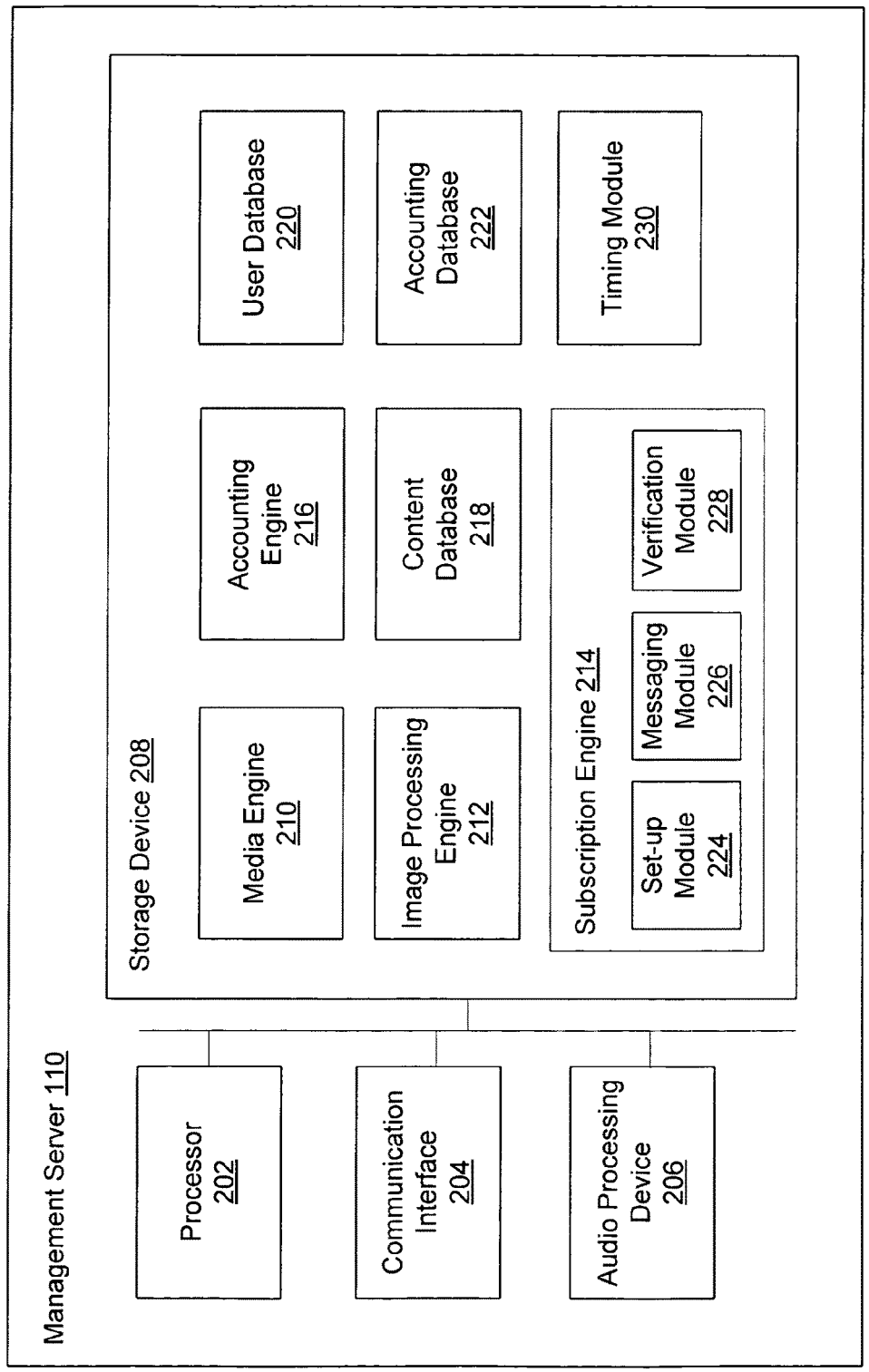
FIG. 2 is a block diagram of an exemplary management server.

Referring now to FIG. 2, an exemplary management server 110 is shown. The management server 110 is configured to organize, maintain, and provide web events to the channel players. These web events may comprise presentations by one or more presenters, as discussed herein. As such, the management server 110 provides components which enable the self management (e.g., set-up and preparation) of these web events.

In exemplary embodiments, live web event may be provided to the channel players in substantially real-time. In exemplary embodiments, the management server 110 may encode data associated with each live web event. This encoding may be performed on-the-fly. That is, for example, live audio data may be encoded into a formatted audio stream that is optimized for network 104 distribution. The formatted audio stream may then be synchronized with one or more presentation events (e.g., slide changes, providing votes) during the live web event by injecting control data associated with the presentation event. In some embodiments, the management server 110 may also insert a delay into the formatted audio stream to perform the synchronization. Further details of the synchronization process for a live web event is provided in co-pending U.S. patent application Ser. No. 12/151,768, entitled "Systems and Methods for Integrating Live Audio Communication in a Live Web Event," which is hereby incorporated by reference.

The exemplary management server 110 may comprise a processor 202, a communication interface 204, an audio processing device 206, and at least one storage device 208. It should be noted that while all these components and associated functionalities are described as operating within a single management server 110, various embodiments contemplate having more than one server for providing the components and functions of the management server 110 and/or more than one of each of the engines, modules, or components within the management server 110. Furthermore, the various components of the channel management system 102 may comprise their own servers coupled in communication (e.g., embodiment of FIG. 12).

In exemplary embodiments, the communication interface 204 is configured to interface the management server 110 with the various networks and servers. In one embodiment, the communication interface 204 comprises a VoIP client for directly receiving audio or video including the live audio data from the presenter device 108 via the communication network 104. In other embodiments, the communication interface 204 comprises a VoIP client for receiving the live audio data from the PBX server 114. In these embodiments, the live audio data from one or more presenter devices 108 may be received via various PSTN or VoIP protocols (e.g., SIP G.711 or other similar protocols). Alternatively, audio data (e.g., high definition audio) may be received from the presenter. In yet another alternative embodiment, a plurality of independent audio streams (e.g., from individual channels) from each presenter may be received from the PBX server 114.

According to exemplary embodiments, the audio processing device 206 is enabled to apply gain control to the received audio data and provide the processed audio to a media engine 210 for encoding. By using the audio processing device 206, performance requirements of an encoder of the media engine 210 may be reduced since there is no need to transcode the audio into a correct format. In some embodiments, the audio processing device 206 may comprise a sound card. In alternative embodiments, the audio processing device 206 may comprise software which eliminates the need for the sound card. In yet another embodiment, the PBX server 114 may perform protocol conversion (e.g., into a format that is compatible with subscriber devices 116), thus eliminating the need to transcode the audio.

The storage device 208 may comprise one or more devices which function as memory or storage for the management server 110. The exemplary storage device 208 may comprise the media engine 210, an image processing engine 212, a subscription engine 214, an accounting engine 216, and a plurality of databases. These databases may comprise a content database 218, a user database 220, and an accounting database 222. The storage device 208 may further comprise a timing module 230.

The exemplary media engine 210 is enabled to provide live web events and/or requested past web events to subscriber devices 116. Additionally, the media engine 210 encodes live audio data and injects control data associated with a presentation event to generate a combined formatted stream. In exemplary embodiments, the control data comprises a pointer to the presentation event and content in the content database 218. The media engine 210 may be further configured to allow channel owners and/or presenters to establish web events on a channel and to set-up and prepare web event content prior to the live web event. The media engine 210 will be discussed in more details in connection with FIG. 3 below.

The image processing engine 212 may be configured to receive and process any images that will be used in live web events. Images can include, but are not limited to, pictures, videos, individual slides, slide shows, animation, or any combination of these images. In some embodiments, the images may comprise slides that will be presented during the live web events. Accordingly, the images may be pre-loaded by the presenter or channel owner via a channel application on the presenter device 108 or channel owner device 106. In one embodiment, the image processing engine 212 comprises a PowerPoint converter which converts an uploaded PowerPoint presentation into static images. In accordance with some embodiments, the images may be stored in the content database 218 for access by subscriber devices 116 during the live web event in response to control data. In one embodiment, the content database 218 comprises a flat file system that organizes the data into catalog data.

The exemplary subscription engine 214 is configured to manage channel subscribers and/or their subscriber devices 116. In some embodiments, the subscription engine 214 may also manage presenters (who may or may not be subscribers as well). In various embodiments, the subscription engine 214 may comprise a set-up module 224, a messaging module 226, and a verification module 228. Other modules associated with subscribers, subscriber devices 116, and subscriber services may be provided.

The exemplary set-up module 224 is configured to set-up an account for the user (e.g., subscriber or presenter). As such, the set-up module 224 may provide questions and request user information from the user. The user information may then be stored in the user database 220 and associated with the user. As a result, an account may be established for each user. It should be noted that the user information for a subscriber may be different than that of a presenter. For example, the presenter may be asked more questions regarding their background so that this information may be provided to advertise the web event.

In one embodiment, the establishment of the account will cause the user to be a subscriber to a current channel being accessed. Thus, the user is now a channel subscriber. As a subscriber, the user may have access to some or all content within the channel. In one example, the subscriber device 116 (associated with the subscriber with the account) can access all past, archived events of the channel through the channel player. The subscriber device 116 can also receive a live event of the channel through the channel player. Additionally, the subscriber device 116 may be provided with a list of future, scheduled events for the channel player.

In exemplary embodiments, when the user accesses a channel, the subscription engine 214 may automatically verify the user's identity via the verification module 228 using stored user information. In some embodiments, dial in access (e.g., using an access PIN) for a presenter may also be verified by the verification module 228. The verification module 228 may also verify individuals associated with the channel owner when the individual attempts to schedule a new web event, invite presenters, or provide content to a scheduled web event.

In some embodiments, the messaging module 226 may be provided to notify users of upcoming events. For example, an invitation may be sent to the subscriber device 116 of a subscriber to the channel to attend the next event. In another embodiment, the messaging module 226 may be used to provide preparation communications to presenters including, for example, an invitation to a user to be a presenter, instructions to the presenter to prepare web event content, or reminders to the presenter regarding an upcoming web event. In some embodiments, the invitation may comprise a link to access the channel player, the channel, and/or the web event. The invitation may also comprise an access PIN for the presenter.

The exemplary accounting engine 216 is configured to manage channel owners and/or channel owner devices 106. In exemplary embodiments, the channel owner may pay a fee for establishing a channel, advertising the channel, having audience participation (e.g., pay the audience for attending and responding) and/or for other functions and services provided by the channel management system 102. The channel owner may also receive fees from the audience, from purchased content, or from sponsors, for example. The accounting engine 216 may maintain records of all these fees.

The accounting engine 216 may also be configured to allocate resources to the channels of the channel owner. For example, a particular channel may be provided a certain amount of content database 218 storage space based on a subscription plan of the channel owner. In exemplary embodiments, the accounting engine 216 may work with the resource manager 118 to allocate these resources accordingly. The information associated with the accounting engine 216 may be stored in the accounting database 222.

The timing module 230 is configured to synchronize the various components of the channel management system 102 and environment 100. In some embodiments, the timing module 230 will synchronize the components to a system clock associated with the management server 110. In other embodiments, the timing module 230 may synchronize the components to another system clock within the environment 100. By synchronizing the various components, coordinated time-based system events may be generated and performed. For example, the messaging module 226 may provide reminder notifications to users at the appropriate time (e.g., "event starting in 2 hours"). In another example, the PBX server 114 may be may be provided timing information from the timing module 230 such that the PBX server 114 will know an exact time of events. It should be noted that the timing and scheduling works for every time zone in the world (i.e., regardless of where the users are located).

Figure 3:
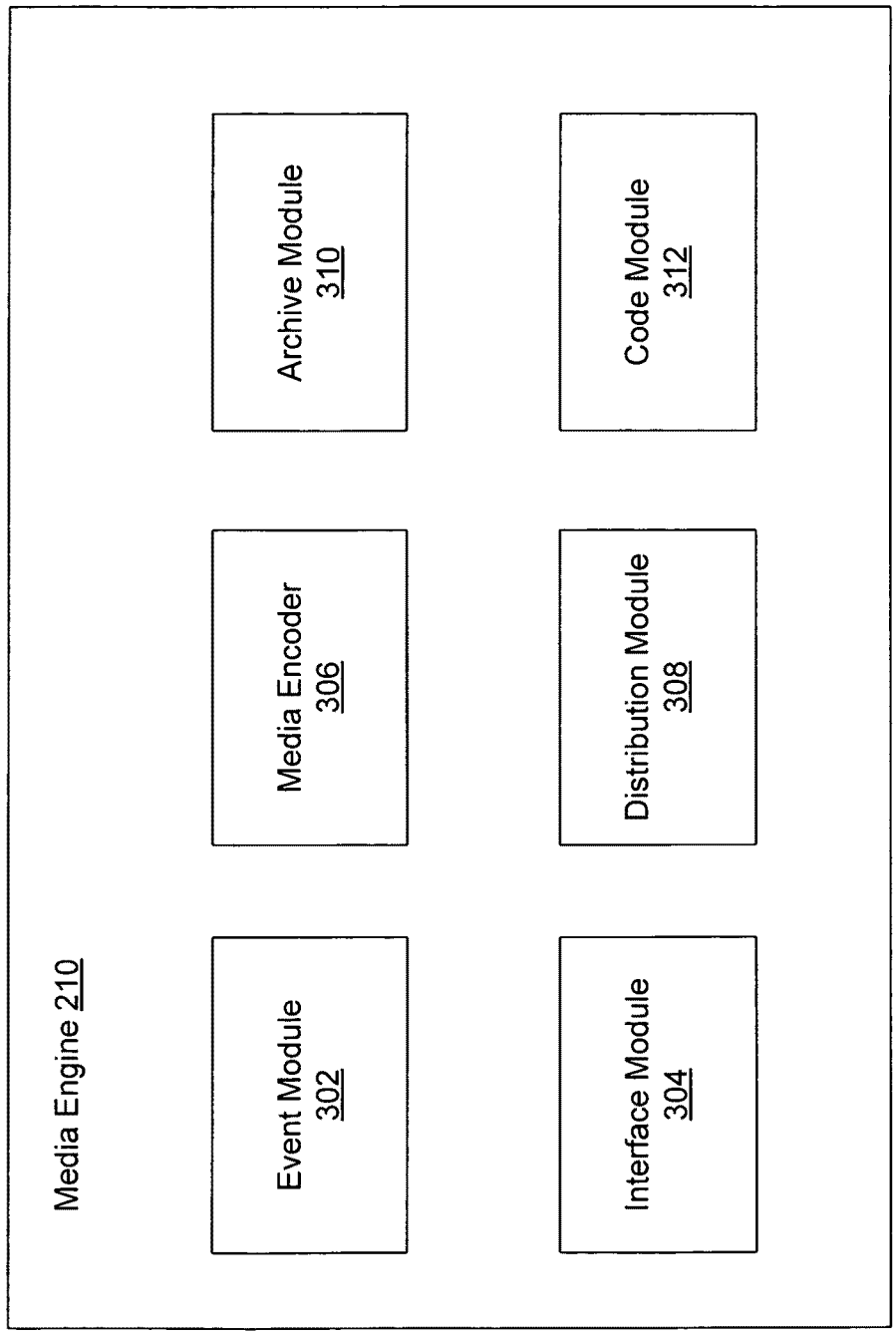
FIG. 3 is a block diagram of an exemplary media engine.

Referring now to FIG. 3, the media engine 210 is shown in more detail. In exemplary embodiments, the media engine 210 is enabled to allow self management (e.g., scheduling, set-up, and preparation) of web events. The media engine 210 may be further enabled to provide live web events and requested past web events to subscriber devices 116 via the channel player. In accordance with one embodiment, the media engine 210 comprises an event module 302, an interface module 304, a media encoder 306, a distribution module 308, an archive module 310, and a code module 312. Alternative embodiments may comprise more, less, or functionally equivalent modules and still be within the scope of present embodiments.

In exemplary embodiments, the event module 302 is configured to allow the channel owner (e.g., via the channel owner device 106) and/or the presenter (e.g., via the presenter device 108) to establish and manage web events on a channel. In some embodiments, the event module 302 may provide an interface which allows the channel owner or presenter to enter details of a new event. The details may comprise title of the web event, description, event time, etc.

Once the scheduling instructions are processed, the web event may be listed on the channel. The event module 302 may aggregate a list of upcoming and archived events. This will then allow subscribers to register for an upcoming web event, and allow presenters to start preparing content for the upcoming web event. In exemplary embodiments, the event module 302 may allow the presenter (via the presenter device 108) or channel owner (via the channel owner device 106) to upload content such as images (e.g., slides and/or videos) or other materials (e.g., documents, prepares votes) to the management server 110 prior to the live web event. In an alternative embodiment, the image processing engine 212 may perform the function of uploading images to the management server 110.

The exemplary event module 302 may also allow the presenter or channel owner to directly prepare content (e.g., votes, slides, or other interactive materials) with the management server 110. In one embodiment, the presenter may generate a plurality of votes (e.g., polling questions and answers) prior to the web event. These votes may then be stored in the content database 218. The polling questions may comprise a question and a plurality of answers. During the live web event, one or more of the votes may be used to gauge the audience and obtain feedback or direction.

The exemplary interface module 304 provides various interfaces on the channel player. One such interface comprises a listing of one or more web events (e.g., channel listing). The web events may comprise any combination of past, current, and/or future events. In accordance with some embodiments, the interface module 304 may work in connection with the event module 302 to provide a management interface to the presenter or channel owner which allows the presenter or channel owner to perform scheduling, set-up, and preparation functions. In alternative embodiments, the management interface may be provided by the event module 302. Examples of the management interface are provided and discussed in more detail below.

In exemplary embodiments, the media encoder 306 is configured to encode live audio into a formatted audio stream and inject control data into the formatted audio stream to create the live web event, and provide the synchronized live web event to the subscriber devices 116. The control data may be a pointer to one or more content (e.g., images) or content changes (e.g., image changes) or a pointer to one or more votes, for example.

The distribution module 308 is configured to provide data to the subscriber devices 116 and presenter devices 108. The data may comprise live and archived events as well as presentation events (e.g., slide changes, polling questions) associated with control data. For example, if the subscriber device 116 receives a combined formatted stream having control data indicating display of a next slide, the distribution module 308 will, upon receiving a request from the subscriber device 116 for the next slide, provide the next slide to the subscriber device 116.

In exemplary embodiments, the live web event may be archived by the archive module 310 and stored immediately or relatively soon after the distribution of the live web event. The archived event may be stored in the content database 218. The listing of the web events on the channel may then be updated by the interface module 304 to indicate that the previous live web event is now an archived web event. Subsequently, the subscriber devices 116 may access and request archived web events via the distribution module 308. It should be noted that the functions of the interface module 304 and the distribution module 308 may be combined within a single module.

The exemplary code module 312 is configured to generate the embeddable code which provides access to the channel and provides an instance of the channel player on a subscriber device 116 and/or presenter device 108. In accordance with one embodiment, the code module 312 will generate the code based, in part, on information provided by the channel owner when scheduling the web event. The code may comprise generic coding to provide the channel player on a browser of the user activating the code. The code may also comprise a specific tag to indicate a particular channel. In some embodiments, the code module 312 is configured to provide the code to support channel players on different browsers. In further embodiments, embedded code may comprise a tag that takes a user directly to a web event. For example, the tag may comprise a channel ID and web event ID. Activation of this tag may take the user directly to the web event identified by the web event ID.

As previously discussed, the timing module 230 enables the synchronization of the components of the media engine 210 with a system clock. As such, the event module 302 and interface module 304 will know the exact time for events to occur. Furthermore, the archive module 310 may translate real-time actions by presenters into a correct reproduction in a recorded web event.

It should be noted that the management server 110 of FIG. 2 and the media engine 210 of FIG. 3 are exemplary. Alternative embodiments may comprise additional or fewer modules and still fall within the scope of various embodiments. Further, the functions of the modules may be combined within fewer modules and still fall within the scope of embodiments. In some embodiments, the various modules may comprise one or more servers.

Figure 4:
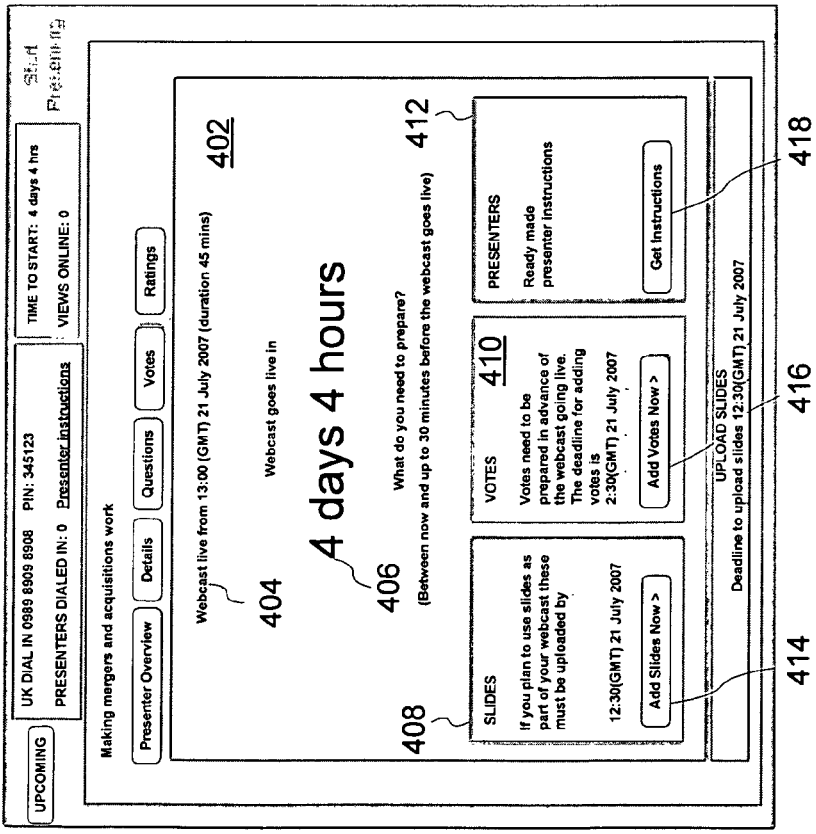
FIG. 4 is an example screenshot of a management interface.

Referring now to FIG. 4, an example of a management interface 400 screenshot is shown. The management interface 400 may be provided to the channel owner or the presenter once a web event has been scheduled. In one embodiment, the channel owner may send an invitation to one or more presenters, providing a link or access to the management interface 400. In these embodiments, the presenter may be provided a presenter login page whereby the presenter may log in using an access PIN received from the channel owner. As a result, the presenter does not need to navigate through a channel to reach the management interface 400. In exemplary embodiments, the management interface 400 is provided via the channel player (onto the user's device) by the interface module 304.

A main portion 402 of the management interface 400 provides an information bar 404, a countdown clock 406, and a plurality of preparation blocks (e.g., slides block 408, votes block 410, and presenters block 412). The exemplary information bar 404 indicates the start time and date of the web event that is currently being managed along with duration of the web event. Other information may be provided such as names of presenters, for example. The countdown clock 406 provides a time indicator (e.g., synched to the system clock by the timing module 230) until the start of the scheduled web event. In the present example, the web event entitled "Making mergers and acquisitions work" is scheduled to go live in 4 days and 4 hours.

The exemplary preparation blocks are configured to allow the channel owner and/or presenters to prepare for the web event. The slides block 408 enables the uploading of web event content to the management server 110 by activation of a slides selection 414. Similarly, the votes block 410 enables the preparation of votes upon activation of a votes selection 416. The presenters block 412 provides instructions to the presenters upon activation of an instruction selection 418. While the slide block 408 enables uploads, it should be noted that any content may be uploaded by embodiments of the present invention. Furthermore, while the votes block 410 allows generation of votes, it should be noted that any content may be generated by embodiments of the present invention. Example interfaces associated with each of these presentation blocks will be provided and discussed below.

In exemplary embodiments, the presenters or channel owner are allowed to prepare web event materials up a default lockout time period (e.g., synched to the system clock by the timing module 230) prior to the start of the web event. Once the lockout time period is reached, the users are not allowed (i.e., "locked out") to prepare any further materials for the web event. In the present example, the default lockout time period is 30 minutes. However, alternative embodiments may comprise any default lockout time period (e.g., 15 minutes).

Furthermore, some embodiments may allow the channel owner to change the default time period.

Figure 5A:
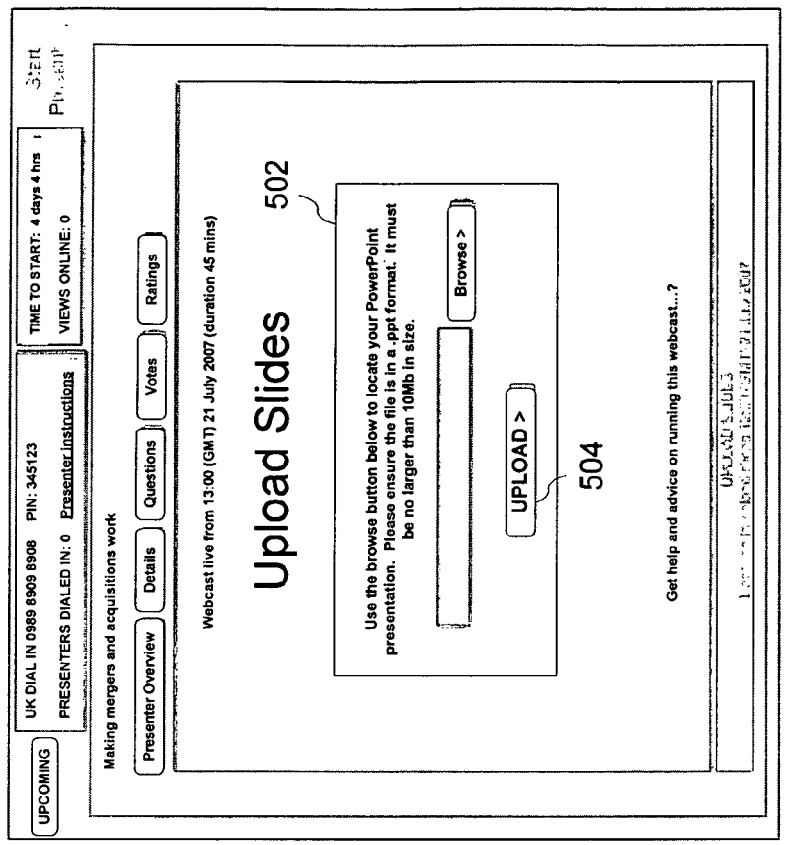
FIG. 5a-FIG. 5c are example screenshots illustrating slide preparation.

Upon activation of the slides selection 414, an upload slide interface 500 may be provided to the user (e.g., presenter or channel owner) as illustrated in FIG. 5a. In exemplary embodiments, the upload slide interface 500 may provide a browse feature 502 that allows the user to browse for the slides to be uploaded to the management server 110. In the present example, the browse feature 502 will allow the user to search a hard drive of the user device (e.g., channel owner device 106 or presenter device 108) for files that may contain the slides. Once the proper file is found, the user may upload the file by activating an upload selection 504.

Figures 5B, 5C:
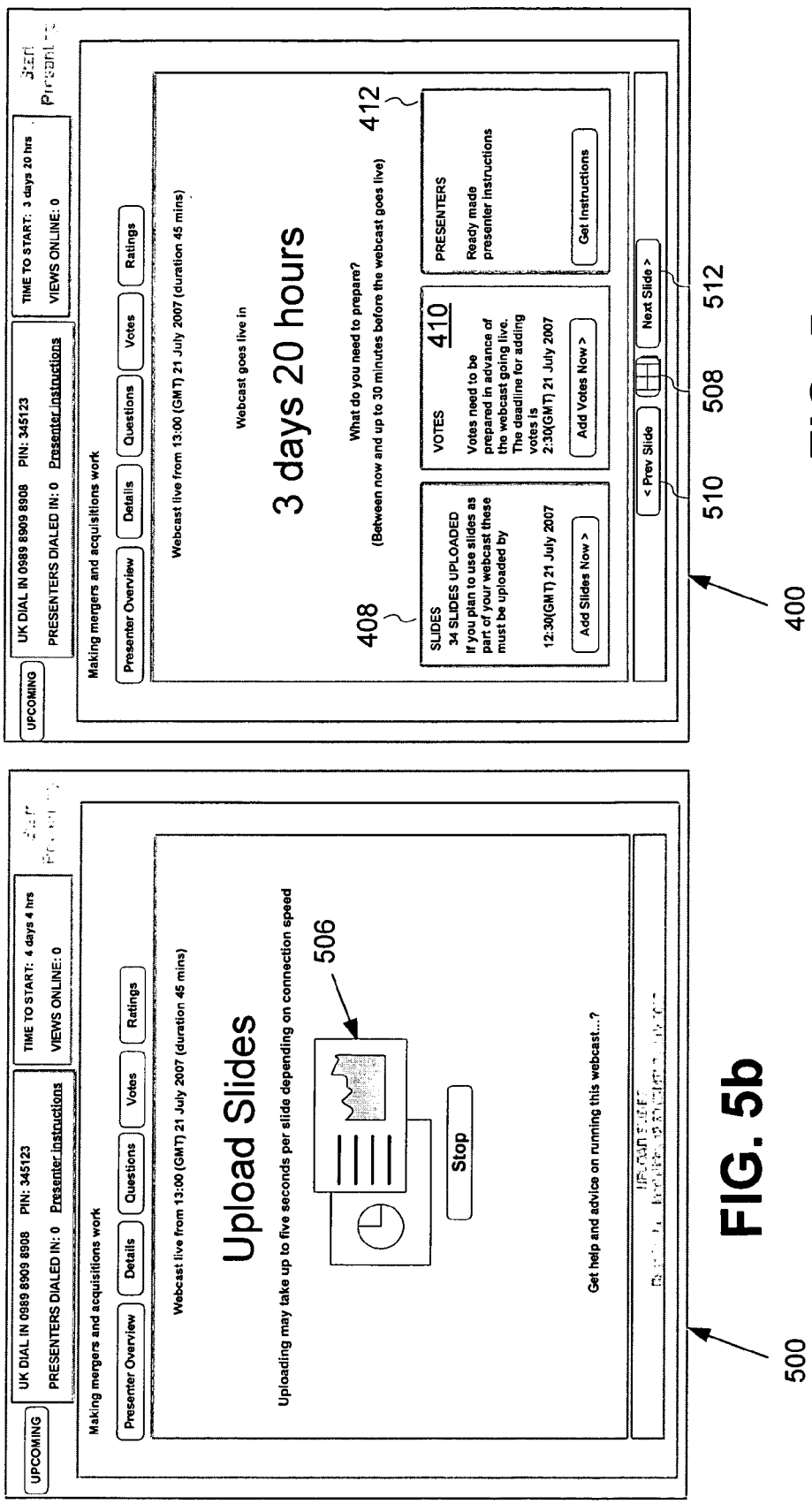

Upon activating the upload selection 504, the upload slide interface 500 transitions to illustrate an upload slide status 506 as illustrated in FIG. 5b. The upload slide status 506 may graphically or textually indicate that the slides are currently being uploaded. In some embodiments, the upload slide status 506 may also indicate amount of slides already uploaded, amount of slides remaining to upload, amount of time remaining to complete upload, and so forth. As such any types of upload status may be provided to the user. In further embodiments, a status of conversion may be provided (e.g., 1 of 25 slides . . . 20 of 25 slides . . . ), until conversion of the slides is completed. The slides may be uploaded to the content database 218.

Once the upload process is completed, the user may be returned to the management interface 400 as illustrated in FIG. 5c. Because slides are now associated with the web event, the management interface 400 now indicates in the slide block 408 that slides are added. In the present example, 34 slides have been added to the web event. Once saved, the new slides may be added to the saved slides up to the default lockout time period. In other embodiments, the uploaded slides may replace some or all of the previously saved slides.

In exemplary embodiments, the saved slides may also be modified up to the default lockout time period. The user may select an edit selection (not shown) to view and edit slides. Alternatively, the user may select the "34 slides added" indicator in the present example to view and edit the saved slides. In yet another embodiment, the user may activate a slide icon 508 to view one or more saved slides. A "prev slide" selection 510 and a "next slide" selection 512 may also be provided to help the user navigate between saved slides.

It should be noted that while the upload slide interface 500 is illustrated as providing capabilities for upload of a Power-Point presentation, alternative embodiments may receive any type of images or documents. For example, embodiments of the present invention may upload documents, videos, non-Power Point presentations, prepared votes, and so forth. It is also contemplated that a similar interface may be provided that allows the user to construct images (e.g., slides) directly into the management server 110 (e.g., via an application that allows generation and saving of the slides directly into the content database 218).

Figures 6A, 6B:
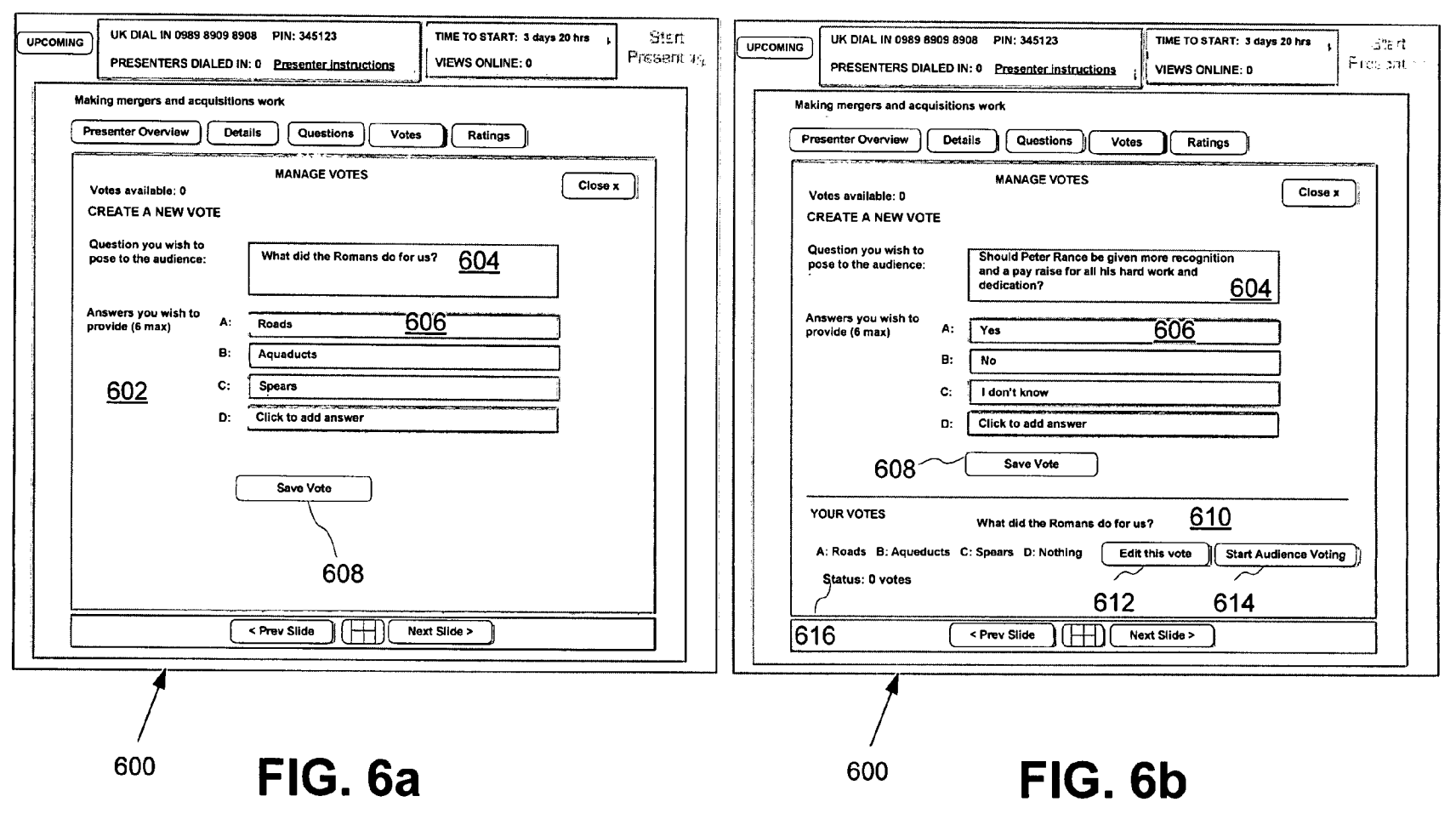

In embodiments whereby the user selects the votes block 410, a manage votes interface 600 as shown in FIG. 6a is provided to the user. In the present embodiment, the manage votes interface 600 provides a create vote section 602 comprising a question field 604 where the user may input a polling question for the intended audience. The user may input the polling question by clicking in the question field and typing the polling question.

The manage votes interface 600 further comprises a plurality of answer fields 606. The user may click on the plurality of answer fields 606 and input answers to the polling question. While the example of FIG. 6a allows for a maximum of six answers to any polling question, only four answers are shown. Alternative embodiments may contemplate having any number of answers for the polling question. Once all the answers are inputted, the user may save the vote by selecting a "save vote" selection 608.

Once the vote is saved, the user may input another vote. In some embodiments, the user may continue to view the manage vote interface 600 after each vote save until the user decides to exit the manage vote interface 600. In other embodiments, the user may need to indicate that another vote should be inputted upon the previous vote save. In either scenario, the user may be presented with the manage votes interface 600 illustrated in FIG. 6b.

The manage votes interface 600 provides the same question field 604 and answer fields 606. However, previous saved votes may also be displayed in a "your votes" section 610. If a plurality of save votes is present, a mechanism may be provided to allow the user to scroll through or otherwise view the save votes. During the preparation period (e.g., time prior to the lockout time period), the user may edit any one of the save votes by activating an "edit this vote" selection 612. It should be noted that the presenter may prepare more votes than may be used during the web event.

In embodiments which utilize the same manage votes interface 600 during a live web event, a "start audience voting" selection 614 may be provided. Thus, the user may, for example, scroll through the saved votes in the "your votes" section 610 and select a vote to provide to the audience during the web event. A status 616 may indicate the number of audience members that have voted on the polling question. It should be noted that during the live web event, the create vote section 602 may not be provided in accordance with some embodiments. In other embodiments, the create vote section 602 may be available during the live web event such that the presenter may be enabled to create a vote on-the-fly (e.g., based on audience feedback or to gauge audience interests). In yet another embodiment, the presenter may provide a "quick vote" whereby the presenter may verbally ask a question and answers may be provided on a predetermined basis (e.g., yes, no, maybe, strongly agree, agree, disagree, strongly disagree).

In embodiments with more than presenter, each presenter may prepare web event content (e.g., slides, votes, etc.). The web event materials may, in some embodiments, be combined between some or all of the presenters whereby any presenter may have control over the combination of web event content. Alternatively, each presenter may only have control over the web event materials that they individually prepared, or for which they have been granted permission.

Figures 7, 8A:
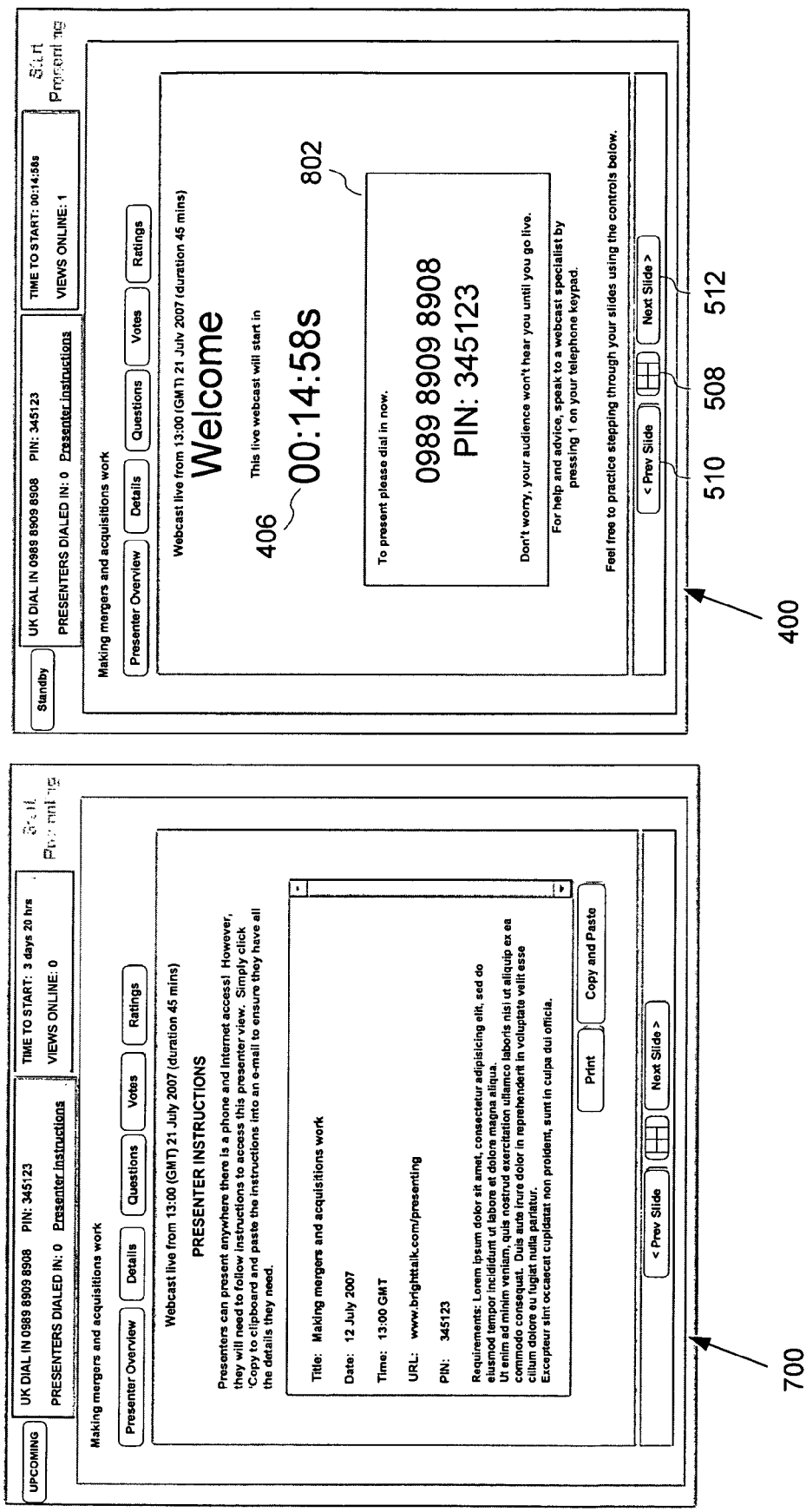
FIG. 7 is an example screenshot illustrating presenter instructions.
FIG. 8a-FIG. 8d are example screenshots illustrating final run-up to a live web event.

Referring now to FIG. 7, an example of a presenter instruction interface 700 is shown. In exemplary embodiments, the presenter may access the presenter instruction interface 700 by activating the instruction selection 418. In other embodiments, the instructions may be provided via a link or other mechanism from the channel owner (e.g., the channel owner selects the instruction selection 418 which then sends the link or the actual instructions to the presenter). For example, the prepared instructions may be copied into an e-mail message by the channel owner and e-mailed to the presenter.

In exemplary embodiments, the presenter instructions provide information to the presenter that will help the presenters prepare for the web event. In the present example, the presenter instructions comprise title, date, time, URL, dial in number, access (presenter) PIN, and requirements of the web event. Other information may also be provided in the presenter instructions.

Some of the information in the presenter instructions may be automatically generated by the management server 110. For example, the title, date, and time may be obtained from the scheduling information provided by the channel owner. Furthermore, the URL, dial in number, and/or access PIN may be generated by the management server 110 based on the scheduling information. Thus, these fields may be automatically populated with the channel owner providing any additional information.

In the final run-up (time) to the live web event, the presenter may access the management interface 400 via their presenter device 108 and view the management interface 400 illustrated in FIG. 8*a*. The management interface 400 shows the countdown clock 406 in hours, minutes, and seconds. The management interface 400 also comprises a connection section 802 that provides dial in instructions including a phone number and access PIN. At this time, the presenter may be encouraged to dial into a presenter line and establish the phone/browser combination.

While the presenter is now locked out of editing or adding any further content to the web event, the presenter may still view some of these content. For example, the presenter may review the slides that have been previously uploaded and stored in the content database 218. In accordance with one embodiment, the presenter may use the slide icon 508, "prev slide" selection 510, and "next slide" selection 512 to view the slides.

In the present example, a final run-up process begins at 15 minutes prior to the start of the web event. At the beginning of this final run-up process, the presenter may dial into the channel management system 102. Upon dial in, the presenter may be provided audio instructions. For example, the instructions may welcome a caller to a presenter line and instruct the caller, if they are presenting, to enter the access PIN they have been provided (e.g., from the connection section 802). If the access PIN is entered correctly, acknowledgement may be provided and the presenter may be placed on hold (e.g., listen to music) for the web event until the web event goes live. During this hold time, the audience may not be able to hear the presenter. It should be noted that any audio instructions or cues may also be provided visually on the management interface 400.

In some embodiments, a plurality of presenters may be involved with a single web event. In these embodiments, the presenters may be able to communicate with each other during the final run-up process. This allows the presenters to organize and collaborate on an agenda for the web event. Furthermore, the countdown clocks 406 of all presenters may be synchronized to a clock at the management server 110 (e.g., the system clock) by the timing module 230.

As presenters dial into the channel management system 102, the status on the management interface 400 updates accordingly. In FIG. 8*b*, an indication that one presenter has dialed in is shown. The presenter(s) that have dialed in may receive audio countdown cues at predetermined intervals. For example, the management server 110 may audibly indicate (e.g., provide the audio indication or instructions to provide the audio indication) when there is ten, five, four, three, and two minutes to go until the web event goes live to the online audience.

Figure 8C:
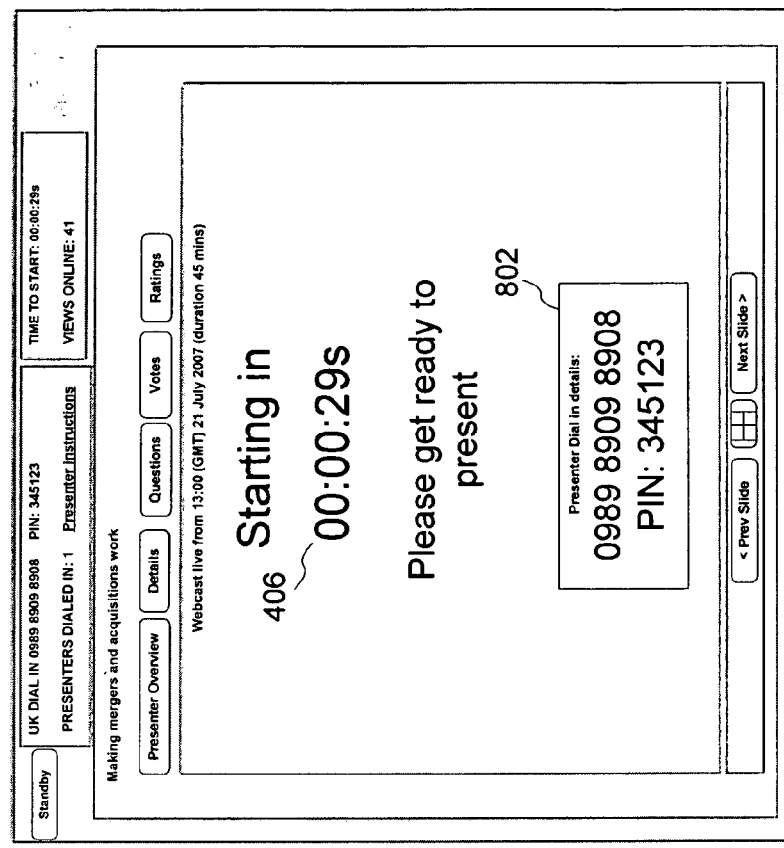
Figure 8B:
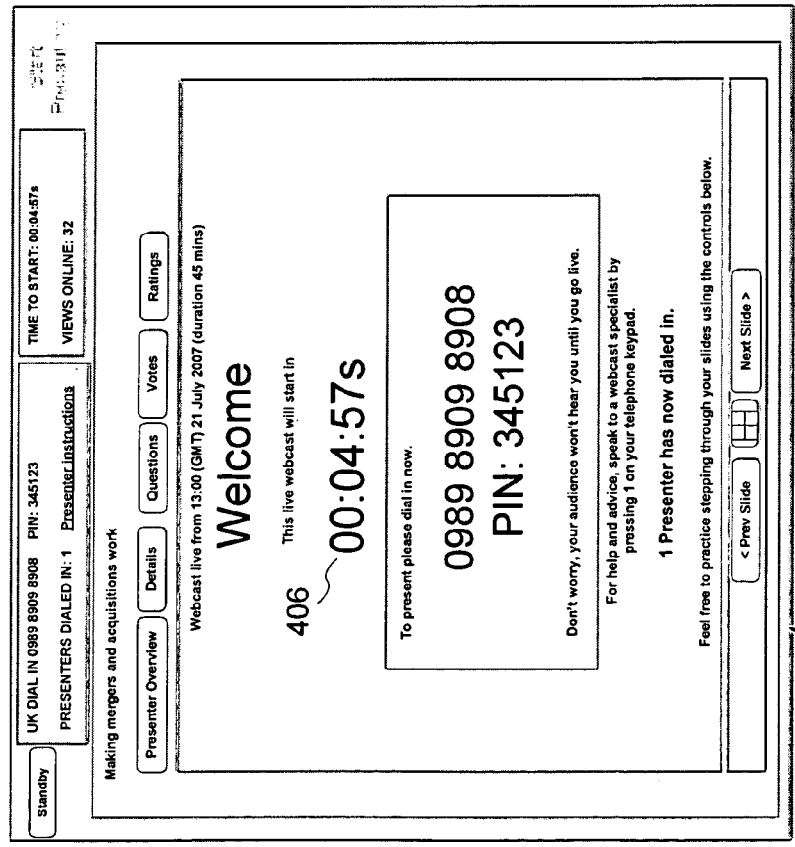

As the countdown clock 406 enters the final minute (or any other predefined amount of time such as 30 seconds) prior to the web event going live, the management interface 400 may update to reflect the imminent start of the web event as shown in FIG. 8*c*. The management interface 400 may now instruct the presenter to please get ready to present. Additionally, the management server 110 may audibly indicate that there is one minute to go until the web event goes live and that the presenter should get ready to present. In some embodiments, the connection section 802 may remain on the management interface in case the voice/phone connection should unintentionally become disconnected.

Figure 8D:
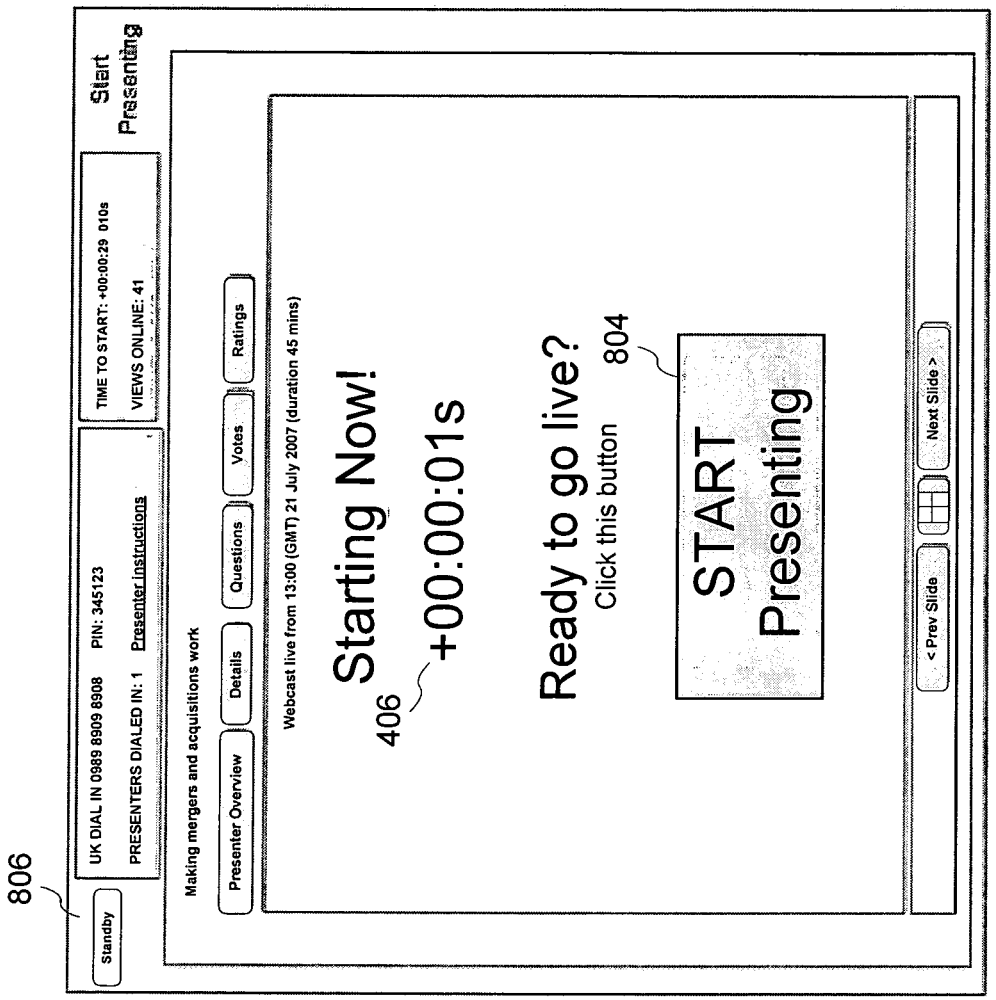

When the start time of the web event occurs, the management interface 400 may further change to indicate the start of the web event as shown in FIG. 8*d*. The management interface 400 may provide a "start presenting" selection 804 which the presenter may need to activate in order to start presenting (e.g., be linked visually and audibly to the audience). Audio cues may be provided that indicate that the web event is now starting and instruct the presenter to activate the "start presenting" selection 804. The audio cues may also provide instructions that upon completion of the presentation, the presenter should activate a stop presenting selection or hang up. In some embodiments, the activation of the "start presenting" selection 804 may automatically trigger the presentation of the first slide, image, or other content as prepared by the presenter. A "stand by" indicator 806 may also change to an "on air" indicator (not shown). Additionally, the countdown clock 406 now turns into a count-up clock.

During the final run-up process to the web event, the resource manager 118 may be allocating resources accordingly. Initially, the resource manager 118 may allocate servers to the presenters and channel as the countdown clock 406 counts down. As the presenters dial in, the resource manager 118 may route the voice call (e.g., assign an encoder). The resource manager 118 may also control information flow provided to the presenter (e.g., via the management interface 400) such as status before and during the web event It should be noted that while embodiments of the present invention have been discussed and illustrated using examples whereby the web event is a presentation, alternative embodiments are contemplated. For example, the web event may comprise an audio/visual conference between a limited number of users. In another example, the web event may be a symposium comprising a plurality of presentations. Any form of information sharing that may be performed via the communication network 104 may comprise the web event.

Figure 9:
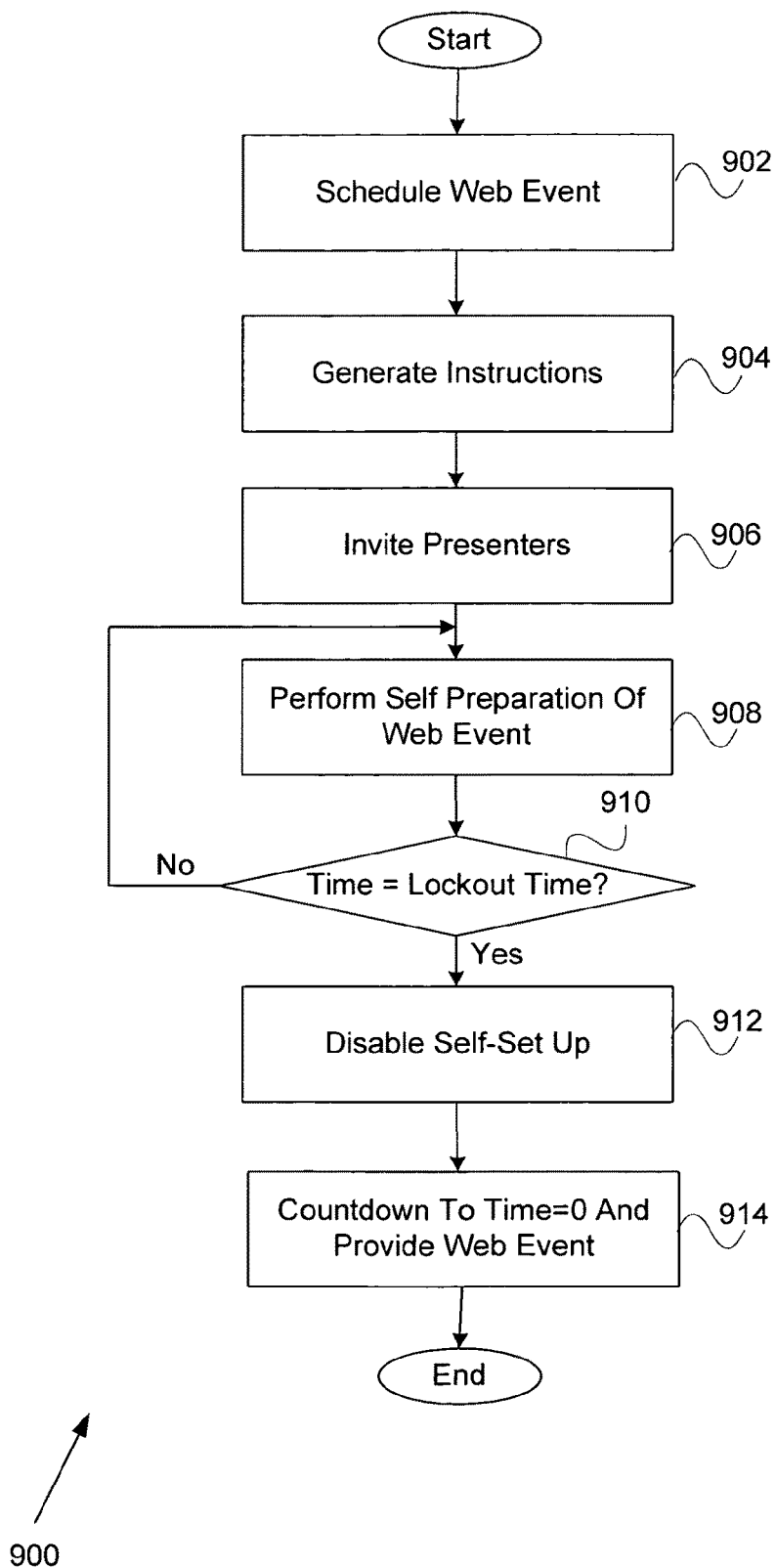
FIG. 9 is a flowchart of an exemplary method for self management of a live web event.

FIG. 9 is a flow diagram 900 showing an exemplary process for self management of a live web event. Embodiments of the present invention allow a channel owner or associated individual to establish and prepare for a web event autonomously. In step 902, the web event may be scheduled. In exemplary embodiments, a user (e.g., channel owner) associated with an established channel may access a scheduling interface to schedule a web event. The scheduling interface may request information such as title, description, presenters, keywords, date, start time, and duration for the web event. Once the requested information is provided, the event module 302 will establish the web event. Subsequently, the web event may appear on a listing for the channel. In exemplary embodiments, the code module 312 may generate a code for the web event. It should be noted that if the user is not associated with an existing channel, the user may be invited to establish a channel prior to establishing a web event for the channel. Further details for establishing a web event may be found in U.S. patent application Ser. No. 12/004,532 entitled "System and Method for Providing a Web Event Channel Player," which is incorporated by reference.

In step 904, instructions may be generated for the presenters. In exemplary embodiments, the instructions may be, at least in part, automatically generated by the event module 302. The instructions may be provided to the presenters via an e-mail, a link, or any other mechanism. In some embodiments, the instructions may be associated with an invitation from the channel owner to the presenter to participate in the web event which may be sent in step 906. In exemplary embodiments, the invitation may comprise a link or access to the management interface 400.

A self preparation process for the web event may then be performed in step 908. In exemplary embodiments, self preparation process may comprise preparing web event content such as, but not limited to, slides and votes. The self preparation process will be discussed in more detail in connection with FIG. 10.

In step 910, the management server 110 (e.g., timing module 230) will determine if a system clock of the management server 110 has reached the lockout time. If the system clock has not reached the lockout time, the presenter is allowed to continue preparing content for the web event. However, if the system clock has reached the lockout time, then the self preparation process is disabled (e.g., by the media engine 210) in step 912. For example, the presenter may no longer be allowed to add or edit slides or prepare further votes.

In step 914, the management server 110 continues the countdown until the system clock reaches the start time of the web event. When this time is reached, the web event will start up and the audience will start receiving audio and/or video for the web event via their channel player.

It should be noted that the method of FIG. 9 is exemplary. Alternative embodiments may contemplate more, less, or functionally equivalent steps or steps practiced in a different order and still be within the scope of exemplary embodiments. For example, steps 904 and 906 may be practiced in reverse or substantially simultaneously.

Figure 10:
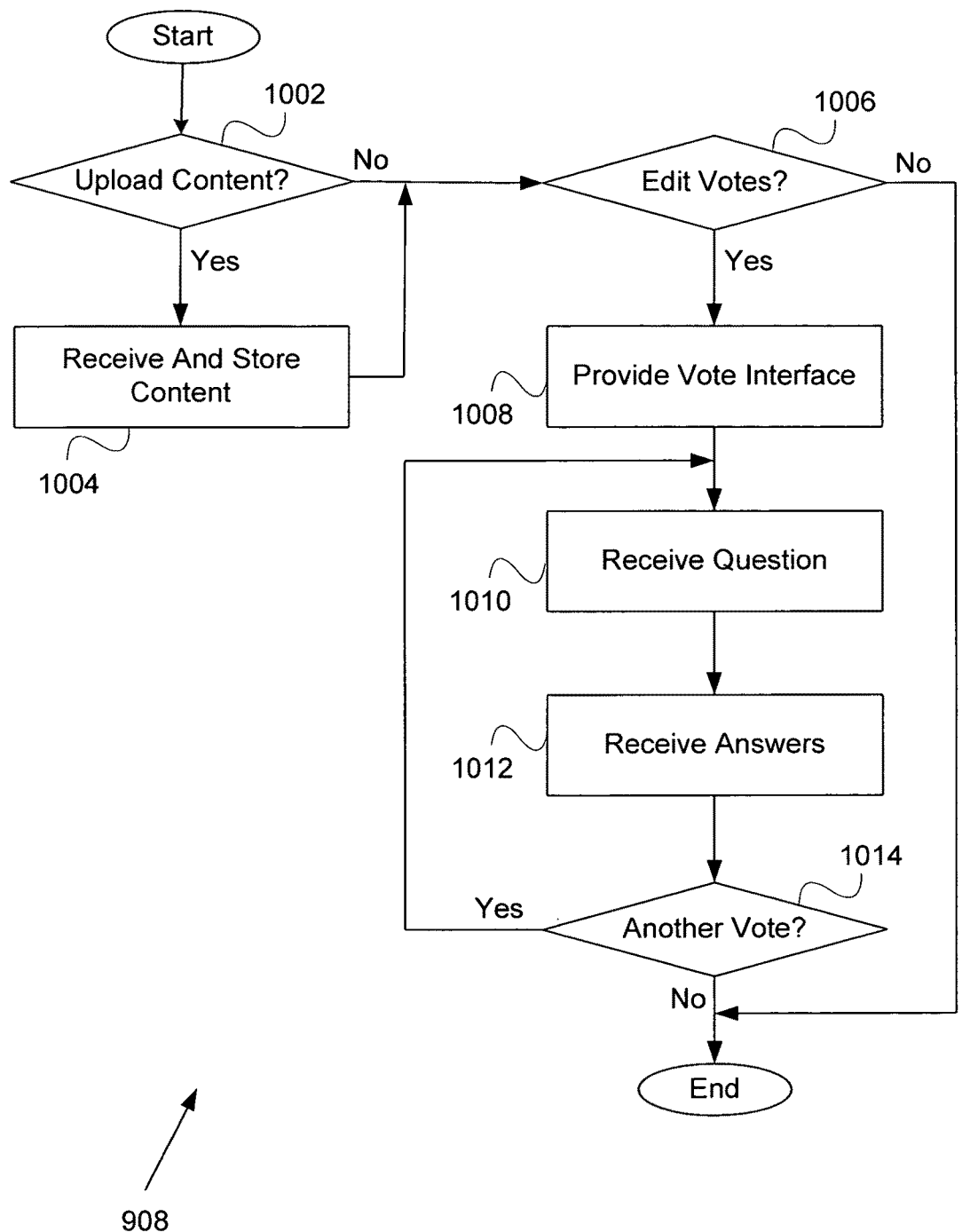
FIG. 10 is a flowchart of an exemplary method for performing self preparation processing for the live web event.

FIG. 10 is a flowchart of an exemplary method for performing self preparation processing for the live web event (step 908). In step 1002, a determination is made as to whether the user has content to upload. In one embodiment, the user may activate a slides selection 414 which indicates that the user has slides to upload to the management server 110. If there are content to upload, then in step 1004, the management server 110 receives and stores the content.

In step 1006 a determination is made as to whether to generate/edit content with the management server 110. In the present embodiments, votes may be generated or edited. Editing of votes comprises creating polling question and answers combinations and/or revising saved polling questions and answers combinations. If editing is requested, then a manage votes interface 600 may be provided to the user in step 1008. Subsequently, the user may enter a polling question in step 1010 and a plurality of answers in step 1012 and save the vote. It should be noted that other content (e.g., images) may be generated or edited using a similar interface.

A determination is made in step 1014 as to whether more votes are to be edited. If more votes are to be edited, then the process returns to step 1010. It should be noted that if editing of votes involves the revising of a saved polling question or answers, the question and answers may be provided to the user and the user may revise by providing a revised question (step 1010) or revised answers (step 1012).

Figure 11:
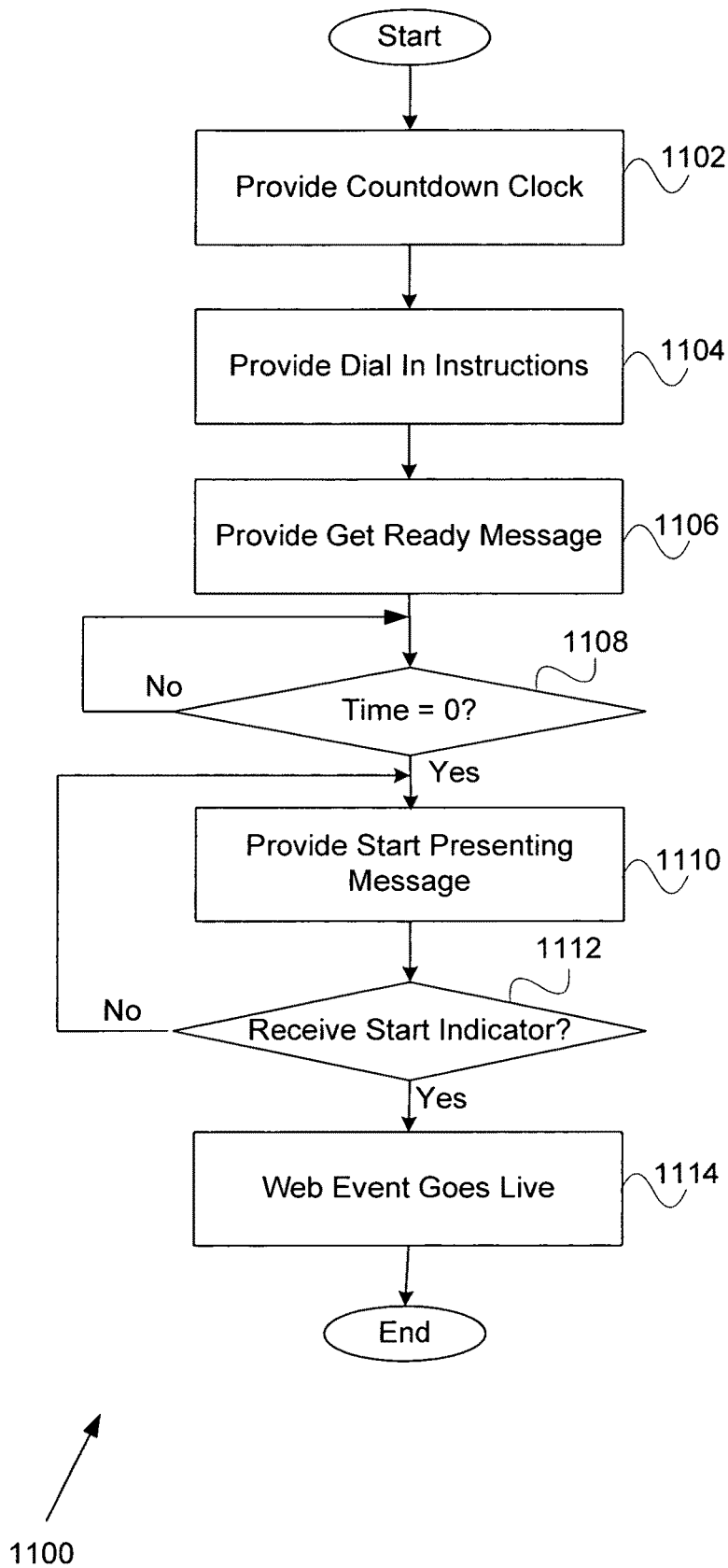
FIG. 11 is a flowchart of an exemplary method for providing final run-up processing.

FIG. 11 is a flowchart 1100 of an exemplary method for providing final run-up processing is shown. In step 1102, a countdown clock is provided (e.g., via the interface module 304). In exemplary embodiments, the countdown clock is synchronized to a system clock of the management server 110 by the timing module 230. As a result, all users (e.g., presenters and channel owner) are operating with the same time. It should be noted that some embodiments may provide the countdown clock as soon as the web event is scheduled. As such, step 1102 may occur prior to the final run-up process.

In step 1104, dial in instructions are provided. In one embodiment, the dial in instructions may be provided at the beginning of the final run-up process. The dial in instructions may be provided via a connections section 802 on the management interface 400.

A get ready message may be provided in step 1106. In one embodiment, the get ready message may be provided one minute prior to the web event start time (e.g., via the interface module 304 or messaging module 226). The get ready message may be provided audibly (assuming the presenter has dialed in), visually via the management interface 400, or both. It should be noted that audio countdown cues may be provided at certain intervals (e.g., ten, five, four, three, and two minutes before the web event) prior to the get ready message.

When the start time is reached in step 1108, a start presenting message is provided in step 1110. The start presenting message may be provided audibly (assuming the presenter has dialed in), visually via the management interface 400, or both.

The management server 110 waits for activation of the "start presenting" selection 804 in step 1112. Upon receiving the "start presenting" selection 804, the presenter goes on air in the live web event and may start presenting in step 1114.

Figure 12:
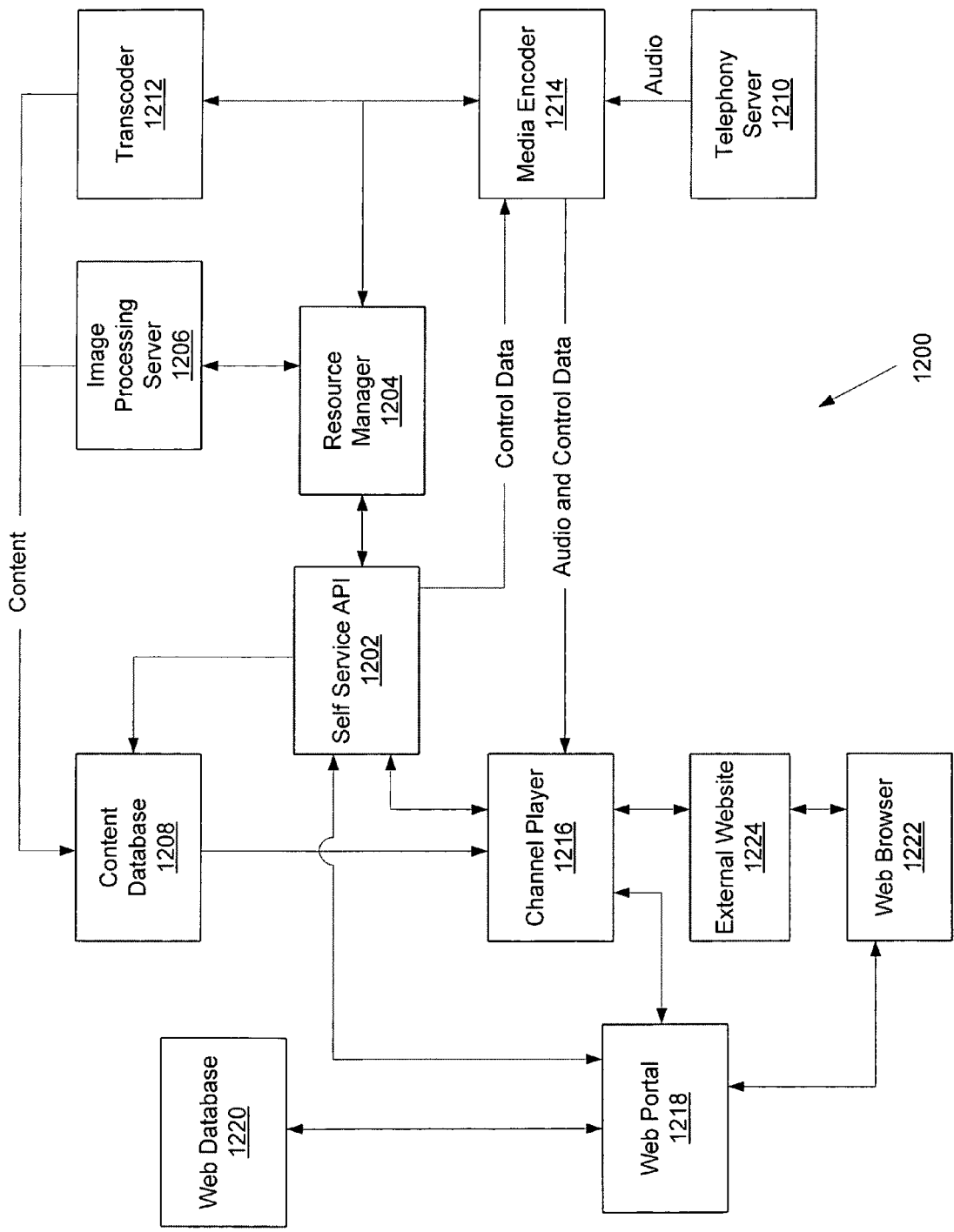
FIG. 12 is a block diagram of an alternative channel management system in communication with user devices.

Referring now to FIG. 12, an alternative embodiment 1200 of the channel management system 102 in communication with a user device (e.g., subscriber device 116) is provided. The alternative embodiment 1200 provides a plurality of servers and databases coupled together to perform the processes as discussed herein. The present embodiment may comprise a self service API 1202, resource manager 1204, image processing server 1206, content database 1208, telephony server 1210, transcoder server 1212, media encoder 1214, channel player 1216, web portal 1218, and web database 1220 coupled in communication together. The live web events may be provided to a web browser 1222 of one or more presenters and subscribers. The resource manager 1204 operates as discussed in conjunction with FIG. 1 above. The image processing server 1206 and the content database 1208 function as discussed above in connection with the image processing engine 212 and content database 218 of FIG. 2. The media encoder 1214 (server) is similar to the media encoder 306 (module).

The self service API 1202 is configured to coordinate communications between different components of the system. In some embodiments, the self service API 1202 may create, modify, and catalog content in the content database 1208 as well as allow the channel owner, channel provider, or presenters to set up web events for their associated channels. The self service API 1202 may also read and write data to a reporting database. In one embodiment, the self service API 1202 may comprise the subscription engine 214, event module 302, interface module 304, and distribution module 308.

The telephony server 1210 is configured to receive audio data from the presenters. The telephone server 1210 may comprise a communication interface 204, PBX server 114, a PBX conference bridge, and/or a similar device having similar functionalities.

The transcoder server 1212 is configured to transcode the audio from the telephony server 1210 into a formatted audio stream. In one embodiment, audio data may be received as .wav files and be converted into an .mp3 file. In the present embodiment, the transcoder server 1212 is separate from the media encoder 1214. As such, after the transcoder server 1212 transcodes the audio data, the media encoder 1214 may inject the control data in one embodiment. In another embodiment, the media encoder 1214 may not be utilized and instead, the transcoder server 1212 injects the control data. In yet a further embodiment, control data may be stored in a separate file that is loaded when the channel player starts, whereby neither the transcoder server 1212 nor the media encoder 1214 handles the control data.

The channel player 1216 comprises an interface configured to provide access to a channel comprising past, current, and future web events as well as live web events. The channel player 1216 is discussed in more detail in U.S. patent application Ser. No. 12/004,532, entitled, "System and Method for Providing a Web Event Channel Player;" which is incorporated herein.

The web portal 1218 may be a main online access point for web browsers 1222 associated with the subscribers and/or presenters to the components of the embodiment 1200. The web portal 1218 may also comprise a main content delivery vehicle to the web browser 1222. In accordance with exemplary embodiments, the web portal 1218 is associated with the channel management system 102.

In a further embodiment, the web browser 1222 may receive content via an external website 1224. For example, a channel owner may embed the channel player 1216 (e.g., a link to the channel player 1216) into their own website (e.g., external website 1224). It should be noted that the channel player 1216 may be provided via other mechanism. For example, a downloadable desktop application may be utilized to provide access to the channel player 1216.

In exemplary embodiments, the web database 1220 stores data not associated with web event content. The web database 1220 may include user data and associated accounting and billing information. The web database 1220 may also include channel and web event catalogs. Alternatively, the channel and web event catalogs may be stored in the content database 1208.

The above-described components and functions can be comprised of instructions that are stored on a computer-readable storage medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with the invention. Those skilled in the art are familiar with instructions, processor(s), and storage medium.

While various embodiments have been described above, it should be understood that they have been presented by way of example only, and not limitation. For example, any of the elements associated with the channel management system 102 may employ any of the desired functionality set forth herein above and may be embodied with a plurality of modules or servers. Thus, the breadth and scope of a preferred embodiment should not be limited by any of the above-described exemplary embodiments.

What is claimed is:

1. A method for self management of a live web event, comprising:
receiving scheduling instructions for the live web event and scheduling the live web event for a channel, the channel being a user interface comprising one or more related web events, the one or more related web events being related by a common subject matter;
providing a management interface through which a user may perform self-preparation processing of content prior to the live web event, the self-preparation processing comprising generating and editing the content;
receiving inputs associated with the content from the user via the management interface;
storing the inputs in a content database for use during the live web event;
providing the live web event to a channel player related to the channel in substantially real-time, the channel player comprising a user interface in which the live web event and the one or more related web events are independently selectable;
receiving control data corresponding to a command given by a presenter, the control data stored as a control data file, comprising a current state of the live web event;
putting the control data the into a live audio stream, the live audio stream comprising live audio generated during the live web event; and
providing the content during the live web event, the content being synchronized with the live audio stream via the control data file by
determining whether a predetermined period of time has passed; if the predetermined period of time has passed, transmitting the control data file alongside the live audio stream; if the predetermined period of time has not passed, not transmitting the control data file alongside the live audio stream; determining whether a change in a state of the control data file has occurred; if the change in the state has occurred, transmitting a new control data file and updating the content; if no change in the state of the control data file has occurred, retransmitting the control data file and not updating the content.

2. The method of claim 1 further comprising providing a content upload interface configured to receive inputs for uploading of content.

3. The method of claim 2 wherein the content comprises images.

4. The method of claim 1 further comprising providing a content generation interface configured to receive inputs for generating content.

5. The method of claim 4 wherein the content comprises polling questions and answers.

6. The method of claim 1 wherein the input comprises edits to content stored in the content database.

7. The method of claim 1 further comprising providing at least one preparation communication to one or more potential presenters.

8. The method of claim 7 further comprising providing a link to the management interface via the preparation communication to a presenter.

9. The method of claim 7 further comprising providing access or login information for the live web event via the preparation communication.

10. The method of claim 1 further comprising automatically generating at least a portion of instructions for presenters based on the received scheduling instructions, the instructions for presenters comprising a link to the management interface and login information for the live web event.

11. The method of claim 1 further comprising providing a countdown clock in the management interface, the countdown clock being synchronized to a system clock.

12. The method of claim 1 further comprising disabling the self-preparation processing when a lockout time is reached.

13. The method of claim 1 further comprising providing audio cues prior to the live web event.

14. The method of claim 1, further comprising providing interactive access to the content to two or more presenters, each presenter using a separate computing device, at a time of the live web event.

15. The method of claim 1, the management interface being provided through a channel application on a computing device.

16. The method of claim 1, the providing the live web event comprising encoding the live audio stream in a formatted audio stream that is optimized for network distribution.

17. The method of claim 16, further comprising synchronizing the formatted audio stream with one or more presentation events via additional control data injected into the formatted audio stream, each presentation event being an event initiated by a presenter, during the live web event.

18. The method of claim 1, the control data file comprising data that controls display of the content and the live audio stream comprising commentary provided by one or more participants.

19. The method of claim 1, the live audio stream being received via a Voice over Internet Protocol (VoIP) communication network.

20. A system for self management of a live web event, comprising:
 a media engine configured to receive scheduling instructions for the live web event, establish the live web event on a channel, and process contents for the live web event, the channel being a user interface comprising one or more related web events, the one or more related web events being related by a common subject matter;
 an interface module configured to provide a management interface through which a user may perform self-preparation processing of the content prior to the live web event, and configured to receive inputs associated with the content from the user via the management interface, the self-preparation processing comprising generating and editing the content; and
 a content database configured to store the inputs and provide the live web event to a channel player related to the channel in substantially real-time, the channel player comprising a user interface in which the live web event and the one or more related web events are independently selectable, the media engine receiving control data corresponding to a command given by a presenter, the control data stored as a control data file, comprising a current state of the live web event; putting the control data the into a live audio stream, the live audio stream comprising live audio generated during the live web event, and providing the content during the live web event, the content being synchronized with the live audio stream via the control data file by determining whether a predetermined period of time has passed; if the predetermined period of time has passed, transmitting the control data file alongside the live audio stream; if the predetermined period of time has not passed, not transmitting the control data file alongside the live audio stream; determining whether a change in a state of the control data file has occurred; if the change in the state has occurred, transmitting a new control data file and updating the content; if no change in the state of the control data file has occurred, retransmitting the control data file and not updating the content.

21. The system of claim 20 further comprising a messaging module configured to provide preparation communications to the presenter.

22. The system of claim 20 wherein the interface module is further configured to provide a content upload interface.

23. The system of claim 20 wherein the interface module is further configured to provide a content generation interface.

24. The system of claim 20 further comprising a timing module configured to synchronize components of the system to a particular clock.

25. A non-transitory computer readable medium having embodied thereon a program, the program providing instructions for a method for self management of a live web event, the method comprising:
 receiving scheduling instructions for the live web event and scheduling the live web event for a channel, the channel being a user interface comprising one or more related web events, the one or more related web events being related by a common subject matter;
 providing a management interface through which a user may perform self-preparation processing of content prior to the live web event, the self-preparation processing comprising generating and editing the content;
 receiving inputs associated with the content from the user via the management interface;
 storing the inputs in a content database for use during the live web event;
 providing the live web event to a channel player related to the channel in substantially real-time, the channel player comprising a user interface in which the live web event and the one or more related web events are independently selectable;
 receiving control data corresponding to a command given by a presenter, the control data stored as a control data file, comprising a current state of the live web event;
 putting the control data the into a live audio stream, the live audio stream comprising live audio generated during the live web event; and
 providing the content during the live web event, the content being synchronized with the live audio stream via the control data file by
determining whether a predetermined period of time has passed; if the predetermined period of time has passed, transmitting the control data file alongside the live audio stream; if the predetermined period of time has not passed, not transmitting the control data file alongside the live audio stream; determining whether a change in a state of the control data file has occurred; if the change in the state has occurred, transmitting a new control data file and updating the content; if no change in the state of the control data file has occurred, retransmitting the control data file and not updating the content.

26. A method for self management of a live web event, comprising:
 receiving scheduling instructions for the live web event and scheduling the live web event for a channel, the channel being a user interface comprising one or more related web events, the one or more related web events being related by a common subject matter;
 providing a management interface through which a user may perform self-preparation processing of content prior to the live web event, the self-preparation processing comprising at least one of generating and editing the content;
 receiving inputs associated with the content from the user via the management interface;
 storing the inputs in a content database for use during the live web event;
 automatically generating at least a portion of instructions for presenters based on the received scheduling instructions, the instructions for presenters comprising a link to the management interface and login information for the live web event;
 providing, to one or more potential presenters, at least one preparation communication comprising the instructions for presenters, the at least one preparation communication being transmitted to the one or more potential presenters after the storing the inputs in the content database;

receiving control data corresponding to a command given by a presenter, the control data stored as a control data file, comprising a current state of the live web event;

putting the control data file into a live audio stream, the live audio stream comprising live audio generated during the live web event;

providing the content during the live web event, the content being synchronized with the live audio stream via the control data file by determining whether a predetermined period of time has passed; if the predetermined period of time has passed, transmitting the control data file alongside the live audio stream; if the predetermined period of time has not passed, not transmitting the control data file alongside the live audio stream; determining whether a change in a state of the control data file has occurred; if the change in the state has occurred, transmitting a new control data file and updating the content; if no change in the state of the control data file has occurred, retransmitting the control data file and not updating the content; and providing the live web event to a channel player related to the channel in substantially real-time, the channel player comprising a user interface in which the live web event and the one or more related web events are independently selectable.

27. The method of claim 26, the at least one preparation communication comprising a title, date and time of the live web event.

28. The method of claim 26, the login information comprising at least one of a uniform resource locator, a dial-in number, and an access pin automatically generated by a management server based on the received scheduling instructions.

29. A method for self management of a live web event, comprising:

receiving scheduling instructions for the live web event and scheduling the live web event for a channel, the channel being a user interface comprising one or more related web events, the one or more related web events being related by a common subject matter;

providing a management interface through which a user may perform self-preparation processing of content prior to the live web event, the self-preparation processing comprising generating and editing the content;

receiving inputs associated with the content from the user via the management interface;

storing the inputs in a content database for use during the live web event;

providing the live web event to a channel player in substantially real-time, the channel player comprising a user interface in which the live web event and the one or more related web events are independently selectable;

receiving control data corresponding a command given by a presenter, the control data stored as a control data file, comprising a current state of the live web event;

putting the control data file into a live audio stream, the live audio stream comprising live audio data generated during the live web event;

providing the content during the live web event, the content being synchronized with the live audio stream via the control data file by determining whether a predetermined period of time has passed; if the predetermined period of time has passed, transmitting the control data file alongside the live audio stream; if the predetermined period of time has not passed, not transmitting the control data file alongside the live audio stream; determining whether a change in a state of the control data file has occurred; if the change in the state has occurred, transmitting a new control data file and updating the content; if no change in the state of the control data file has occurred, retransmitting the control data file and not updating the content;

and managing the live web event at a presentation time using a resource manager that manages pools of resources, the pools of resources providing one or more services for one or more applications utilized during the live web event, each resource in a pool providing the same service for an application.

30. The method of claim 29, further comprising:

monitoring the pools of resources in order to allocate resources; and dynamically reallocating resources within a pool of resources if a resource fails, the dynamic reallocating causing one or more of the resources to substitute for the failed resource in providing the service for the application.

31. A method for self management of a live web event, comprising:

receiving scheduling instructions for the live web event and scheduling the live web event for a channel, the channel being a user interface comprising one or more related web events, the one or more related web events being related by a common subject matter;

providing a management interface through which a user may perform self-preparation processing of content prior to the live web event, the self-preparation processing comprising generating and editing the content;

requesting user information from the user, the user information being used to advertise the live web event when the user is a presenter for the live web event;

receiving inputs associated with the content from the user via the management interface;

storing the inputs in a content database for use during the live web event;

providing the live web event to a channel player in substantially real-time, the channel player comprising a user interface in which the live web event and the one or more related web events are independently selectable;

receiving control data corresponding to a command given by a presenter, the control data stored as a control data file, comprising a current state of the live web event;

putting the control data file into a live audio stream, the live audio stream comprising live audio generated during the live web event;

providing the content during the live web event, the content being synchronized with the live audio stream via the control data file by determining whether a predetermined period of time has passed; if the predetermined period of time has passed, transmitting the control data file alongside the live audio stream; if the predetermined period of time has not passed, not transmitting the control data file alongside the live audio stream; determining whether a change in a state of the control data file has occurred; if the change in the state has occurred, transmitting a new control data file and updating the content; if no change in the state of the control data file has occurred, retransmitting the control data file and not updating the content;

and managing the live web event at a presentation time using a resource manager that manages pools of resources, the pools of resources providing one or more services for one or more applications utilized during the live web event, each resource in a pool providing the same service for an application.

32. The method of claim 31, further comprising generating an advertisement for the live web event in a channel listing.

33. The method of claim 31, the pools of resources comprising a group of media encoders that encode media for use during the live web event.

34. The method of claim 33, the pools of resources further comprising a group of slide converters that convert slides used during the live web event.

35. The method of claim 34, the pools of resources further comprising a group of transcoders that transcode data files used during the live web event into a preferred format.

36. A method for self management of a live web event, comprising:
   receiving scheduling instructions for the live web event;
   scheduling the live web event based on the scheduling instructions, the scheduling the live web event being performed for a channel, the channel being a user interface comprising one or more related web events, the one or more related web events being related by a common subject matter;
   providing a management interface through which a user may perform self-preparation processing of content prior to the live web event, the self-preparation processing comprising generating and editing the content;
   requesting user information from the user, the user information being used to advertise the live web event when the user is a presenter for the live web event;
   receiving inputs associated with the content from the user via the management interface;
   storing the inputs in a content database for use during the live web event;
   providing the live web event to a channel player in substantially real-time, the channel player comprising a user interface in which the live web event and the one or more related web events are independently selectable;
   receiving control data corresponding to a command given by a presenter, the control data stored as a control data file, comprising a current state of the live web event;
   putting the control data file into a live audio stream, the live audio stream comprising live audio generated during the live web event;
   providing the content during the live web event, the content being synchronized with the live audio stream via the control data file by
   determining whether a predetermined period of time has passed; if the predetermined period of time has passed, transmitting the control data file alongside the live audio stream; if the predetermined period of time has not passed, not transmitting the control data file alongside the live audio stream; determining whether a change in a state of the control data file has occurred; if the change in the state has occurred, transmitting a new control data file and updating the content; if no change in the state of the control data file has occurred, retransmitting the control data file and not updating the content;
   managing the live web event at a presentation time using a resource manager that manages pools of resources, the pools of resources providing one or more services for one or more applications utilized during the live web event, each resource in a pool providing the same service for an application; and
   providing a create vote option during the live web event configured to allow the user to create a vote on-the-fly.

37. The method of claim 36, further comprising:
   receiving a request to create a vote on-the-fly;
   providing a vote generation interface configured to receive inputs for generating the vote on-the-fly; and
   presenting the vote on-the-fly during the live web event.

38. The method of claim 36, further comprising providing a quick vote on-the-fly comprising:
   receiving audio of the user asking a question; and
   providing a plurality of predetermined answers in response to receiving a quick vote indication from a presenter.

\* \* \* \* \*